US012703589B2

(12) United States Patent

Prasetyo Adi Putra et al.

(10) Patent No.: US 12,703,589 B2

(45) Date of Patent: Aug. 11, 2026

(54) MEDIUM SUPPORT TRAY, MEDIUM CONVEYANCE DEVICE, AND RECORDING DEVICE

(71) Applicant: SEIKO EPSON CORPORATION, Tokyo (JP)

(72) Inventors: Eko Prasetyo Adi Putra, Magetan (ID); Al Hadid Pandu Setyawan, Bekasi (ID)

(73) Assignee: Seiko Epson Corporation, Tokyo (JP)

( * ) Notice: Subject to any disclaimer, the term of this patent is extended or adjusted under 35 U.S.C. 154(b) by 224 days.

(21) Appl. No.: 18/598,769

(22) Filed: Mar. 7, 2024

(65) Prior Publication Data

US 2024/0300755 A1 Sep. 12, 2024

(30) Foreign Application Priority Data

Mar. 9, 2023 (JP) ................................ 2023-036194

(51) Int. Cl.

*B65H 1/02* (2006.01)

*B41J 13/10* (2006.01)

(52) U.S. Cl.

CPC ............. *B65H 1/02* (2013.01); *B41J 13/103* (2013.01); *B65H 2403/411* (2013.01); *B65H 2405/10* (2013.01); *B65H 2801/06* (2013.01)

(58) Field of Classification Search

CPC ............... B65H 1/027; B65H 2402/30; B65H 2402/31; B65H 2405/1122; B65H 2405/1134; B65H 2405/214

See application file for complete search history.

(56) References Cited

U.S. PATENT DOCUMENTS

2012/0187622 A1* 7/2012 Kamichi .................. B65H 3/44 271/171

2015/0097329 A1* 4/2015 Ukai ........................ B65H 1/04 271/9.12

FOREIGN PATENT DOCUMENTS

JP 2016-222402 A 12/2016

* cited by examiner

*Primary Examiner* — Howard J Sanders

(74) *Attorney, Agent, or Firm* — WORKMAN NYDEGGER

(57) ABSTRACT

A medium support tray includes a support part, an auxiliary support part that is provided expandably with respect to the support part and supports a medium together with the support part at an expanded position, a side end guide part that is provided at the support part and regulates a side end in an X axis direction of the medium supported by the support part, an auxiliary side end guide part that is provided at the auxiliary support part and regulates the side end of the medium supported by the auxiliary support part, and a coupling mechanism coupling the side end guide part and the auxiliary side end guide part. The side end guide part moves in the X axis direction in conjunction with movement of the auxiliary side end guide part in the X axis direction, and expandably guides the auxiliary support part via a coupling mechanism.

6 Claims, 18 Drawing Sheets

MEDIUM SUPPORT TRAY, MEDIUM CONVEYANCE DEVICE, AND RECORDING DEVICE

The present application is based on, and claims priority from JP Application Serial Number 2023-036194, filed Mar. 9, 2023, the disclosure of which is hereby incorporated by reference herein in its entirety.

BACKGROUND

1. Technical Field

The present disclosure relates to a medium support tray, a medium conveyance device, and a recording device.

2. Related Art

JP-A-2016-222402 discloses a conveyance device including a tray body part that supports a sheet and a side guide that is movable in a movement direction intersecting a sheet supply direction and contactable with an end part of the sheet. The sheet is an example of a medium. The side guide is provided with an operation part that receives an operation of moving the side guide in the movement direction. It is disclosed that the tray body part includes a base part rotatably provided at a body unit, and an extension part drawable from the base part in a drawing direction opposite to the supply direction of the sheet. In the tray body part, a support surface of the sheet is extended by drawing out the extension part. The side guide is provided at the base part of the tray body part.

However, since the extension part of the tray body part disclosed in JP-A-2016-222402 is not provided with the side guide, there is a risk that the user has difficulty in performing the operation of moving the side guide in the movement direction.

SUMMARY

A medium support tray includes a support part configured to support a medium to be conveyed, an auxiliary support part provided expandably with respect to the support part, the auxiliary support part being configured to support the medium together with the support part at an expanded position upstream of the support part in a conveyance direction of the medium, a side end guide part provided at the support part movably in a width direction intersecting the conveyance direction, the side end guide part being configured to regulate a side end in the width direction of the medium supported by the support part, an auxiliary side end guide part provided at the auxiliary support part movably in the width direction, the auxiliary side end guide part being configured to regulate the side end of the medium supported by the auxiliary support part, and a coupling mechanism coupling the side end guide part and the auxiliary side end guide part, in which the side end guide part moves in the width direction in conjunction with movement of the auxiliary side end guide part in the width direction, and expandably guides the auxiliary support part via the coupling mechanism.

The medium conveyance device includes the medium support tray, and a conveyance unit that conveys the medium supported by the medium support tray.

The recording device includes the medium support tray, a conveyance unit that conveys the medium supported by the medium support tray, and a recording unit that performs recording on the medium conveyed by the conveyance unit.

DESCRIPTION OF EMBODIMENTS

Figure 1:
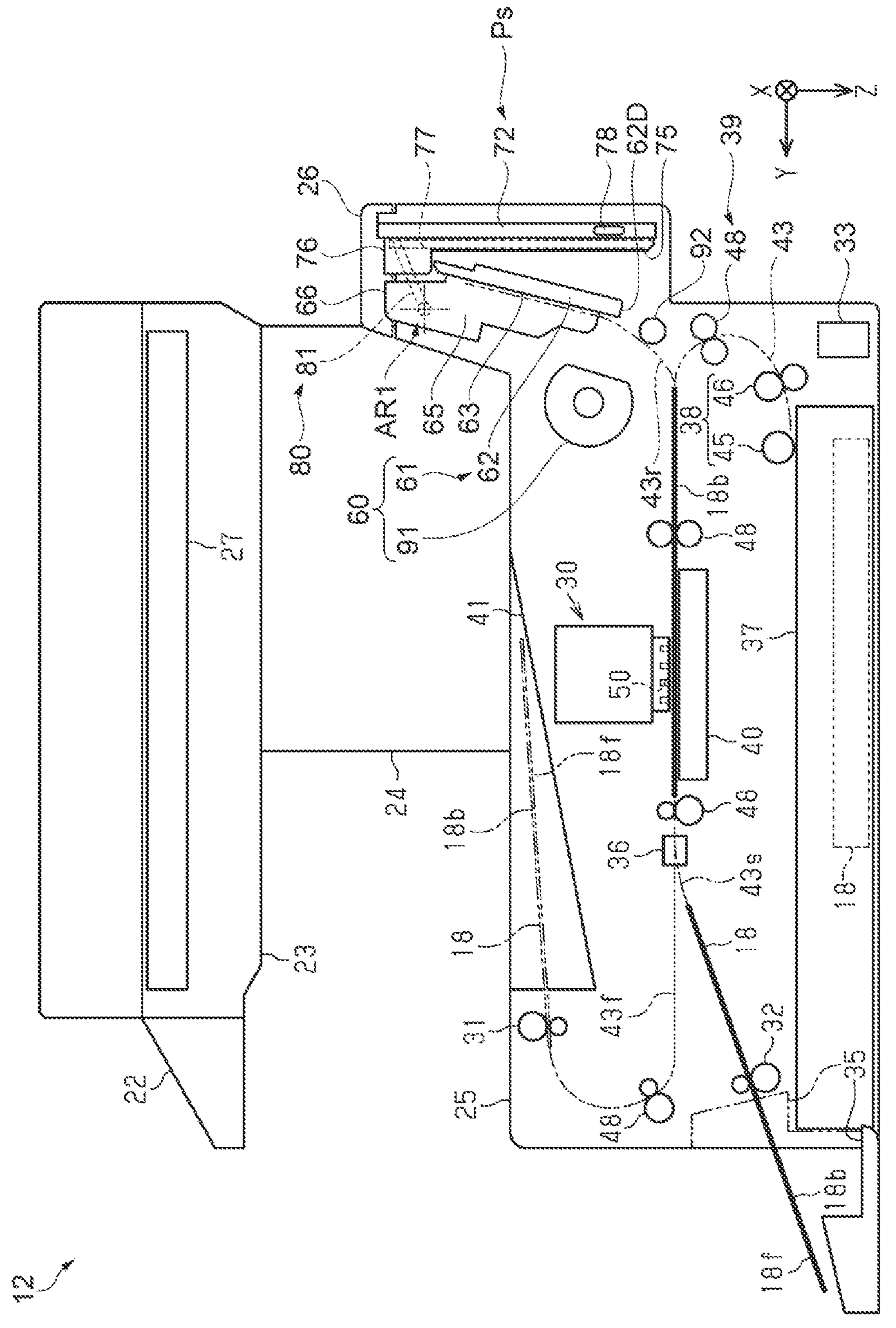
FIG. 1 is a schematic side view illustrating an embodiment of a recording device.

Hereinafter, the present disclosure will be described based on an embodiment. In the drawings, the same members are denoted by the same reference signs, and repeated descriptions will be omitted. Note that in the present description, “same”, “identical”, and “simultaneously” not only refer to being exactly the same but also include a case of being the same in consideration of measurement errors, a case of being the same in consideration of manufacturing variations of members, and a case of being the same within a range where functions are not impaired. Thus, for example, “both dimensions are the same” means that a dimensional difference between both may be within ±10%, may be within ±5%, and may be within ±3% of one dimension in consideration of measurement errors and manufacturing variations of members.

X, Y, and Z in each drawing represent three spatial axes orthogonal to one another. In the present description, directions along these axes are an X axis direction, a Y axis direction, and a Z axis direction. When an orientation is specified, positive and negative signs are used for direction notation with “+” for a positive direction and “−” for a negative direction, and an orientation where an arrow in each drawing is directed is a + direction and an opposite direction to the arrow is a − direction.

Additionally, the Z axis direction indicates a gravity direction, where a +Z direction indicates a vertical downward direction, and a −Z direction indicates a vertical upward direction. A plane including the X axis and the Y axis is described as an X-Z plane, a plane including the X axis and the Z axis is described as an X-Z plane, and a plane including the Y axis and the Z axis is described as a Y-Z plane. The X-Y plane is a horizontal plane. Furthermore, the three spatial axes of X, Y, and Z that are not limited to positive and negative directions will be described as the X axis, Y axis, and Z axis.

In each drawing, the X axis direction is a width direction of a device body 25 described later, which is also a direction intersecting a conveyance direction where a medium 18 is conveyed, that is, a width direction of the medium 18. Hereinafter, the width direction of the medium 18 is referred to as a width direction WD. In the X axis direction, a −X direction is the right direction as viewed from the user when the front surface of the device body 25 faces the user, and a +X direction is the left direction as viewed from the user. In the present embodiment, of the side surfaces forming the periphery of the device body 25, the side surface provided with a discharge cover 35 is the front surface of the device body 25.

The Y axis direction is a depth direction of the device body 25. A −Y direction of the Y axis direction is a direction from the front surface of the device body 25 toward the back surface of the device body 25. A+Y direction of the Y axis direction is a direction from the back surface of the device body 25 toward the front surface of the device body 25.

1. Embodiment 1

A recording device 12 is, for example, an inkjet printer configured to perform recording on the medium 18 such as printing paper. The recording device 12 of the present embodiment is configured to perform recording on a plurality of types of the media 18 having different dimensions in the width direction WD.

As illustrated in FIG. 1, the recording device 12 includes a notification unit 22, a reading body 23, one or more support columns 24, and the device body 25.

The notification unit 22 includes a monitor and a touchscreen, and notifies the user by displaying a message. The notification unit 22 may include a speaker that performs notification by emitting sound. The notification unit 22 may perform notification by delivering voice, or may perform notification by emitting a warning sound or the like. The notification unit 22 may include a light that performs notification by emitting light.

The reading body 23 includes a reading unit 27 that reads a document. The support columns 24 support the reading body 23. The reading body 23 is provided above in the −Z direction of the device body 25 in the Z axis direction. The reading body 23 is spaced apart from the device body 25 in the Z axis direction.

The device body 25 includes a recording unit 30, a first discharge unit 31, a second discharge unit 32, and a control unit 33. The device body 25 further includes a discharge cover 35, a switching mechanism 36, a storage cassette 37, a feeding unit 38, a conveyance unit 39, a medium support part 40, a stacker 41, and a medium conveyance device 60.

In FIG. 1, a conveyance path 43 through which the medium 18 is conveyed and a feeding path 43*r* are indicated by two-dot chain lines, and a first discharge path 43*f* and a second discharge path 43*s* are indicated by one-dot chain lines. The conveyance path 43 is a path coupling the storage cassette 37 and the first discharge unit 31 or the second discharge unit 32. The conveyance path 43 branches in the middle into the first discharge path 43*f* coupled to the first discharge unit 31 and the second discharge path 43*s* coupled to the second discharge unit 32. The feeding path 43*r* is a path joining with the conveyance path 43 and coupling a medium support tray 61 and the conveyance path 43.

The discharge cover 35 opens and closes about a rotation shaft not illustrated. The discharge cover 35 of the present embodiment is movable between an open position indicated by a solid line in FIG. 1 and a close position indicated by a two-dot chain line in FIG. 1. The rotation shaft of the discharge cover 35 may be provided at the storage cassette 37.

The switching mechanism 36 switches the path for conveying the medium 18 by a flap, for example. The switching mechanism 36 may switch the path in conjunction with opening and closing of the discharge cover 35. For example, when the discharge cover 35 located at the open position moves to the close position, the switching mechanism 36 may switch, from the second discharge path 43*s* to the first discharge path 43*f*, the path for conveying the medium 18.

That is, when the discharge cover 35 is located at the close position, the medium 18 is discharged by the first discharge unit 31. For example, when the discharge cover 35 located at the close position moves to the open position, the switching mechanism 36 may switch, from the first discharge path 43*f* to the second discharge path 43*s*, the path for conveying the medium 18. When the discharge cover 35 is located at the open position, the medium 18 is discharged by the second discharge unit 32.

The storage cassette 37 is configured to store a plurality of the media 18 in a stacked state. The storage cassette 37 may be drawable by pulling the discharge cover 35.

The feeding unit 38 includes a pickup roller 45 and a separation roller pair 46. By rotating in a state of being in contact with the medium 18 stored in the storage cassette 37, the pickup roller 45 sends the uppermost medium 18 to the separation roller pair 46. The separation roller pair 46 separates the media 18 one by one by pressing and holding the second and subsequent media 18 from the top. The feeding unit 38 feeds, one by one to the conveyance path 43, the medium 18 stored in the storage cassette 37.

The conveyance unit 39 conveys the medium 18 along the conveyance path 43. The conveyance unit 39 includes a plurality of conveyance roller pairs 48 provided along the conveyance path 43. The convey roller pair 48 conveys the media 18 by rotating in a state of holding the media 18 interposed therebetween.

The medium support part 40 is provided at a position facing the recording unit 30 across the conveyance path 43. The medium support part 40 supports the medium 18 at least a part to be recorded.

The recording unit 30 includes a plurality of nozzles 50 configured to eject liquid. The recording unit 30 ejects ink, which is an example of liquid, and performs recording on a recording surface 18*f* of the medium 18. The recording surface 18*f* is a surface facing the nozzles 50, and is a surface opposite to a back surface 18*b* in contact with the medium support part 40.

The first discharge unit 31 is a discharge unit for discharging the medium 18 on which the recording unit 30 performs recording. The first discharge unit 31 discharges the medium 18 with the recording surface 18*f* facing down.

The first discharge unit 31 discharges the medium 18 in what is called a face-down manner. The first discharge unit 31 is provided between the recording unit 30 and the reading body 23 in the Z axis direction.

The stacker 41 is provided at the upper surface of the device body 25. The stacker 41 receives the medium 18 discharged by the first discharge unit 31. The first discharge unit 31 and the stacker 41 may be located on the −Y direction side relative to the notification unit 22 in the Y axis direction. In other words, the notification unit 22 may be provided at a position more conspicuous than the stacker 41 with respect to the user in front in the +Y direction of the recording device 12 in the Y axis direction. The first discharge unit 31 includes a discharge roller pair that discharges the medium 18 as an example.

The second discharge unit 32 is a discharge unit for discharging the medium 18 on which the recording unit 30 performs recording. The second discharge unit 32 discharges the medium 18 with the recording surface 18*f* facing up. The second discharge unit 32 discharges the medium 18 in what is called a face-up manner. The second discharge unit 32 may be provided in front in the +Y direction relative to the first discharge unit 31 in the Y axis direction. The discharge cover 35 located at the open position may receive the medium 18 discharged by the second discharge unit 32. The second discharge unit 32 includes a discharge roller pair that discharges the medium 18 as an example.

The control unit 33 centrally controls drive of each mechanism in the recording device 12 and controls various operations executed in the recording device 12. The control unit 33 can be configured as a circuit including one or more processors that execute various processing in accordance with a computer program, one or more hardware circuits that execute at least a part of the various processes, or a combination thereof. The hardware circuit is, for example, an application-specific integrated circuit. The processor includes a CPU and a memory such as a RAM and a ROM, and the memory stores a program code or a command configured to cause the CPU to execute processing. The memory, that is, a computer-readable medium includes any readable medium that is configured to be accessed by a general purpose or special purpose computer.

Figure 2:
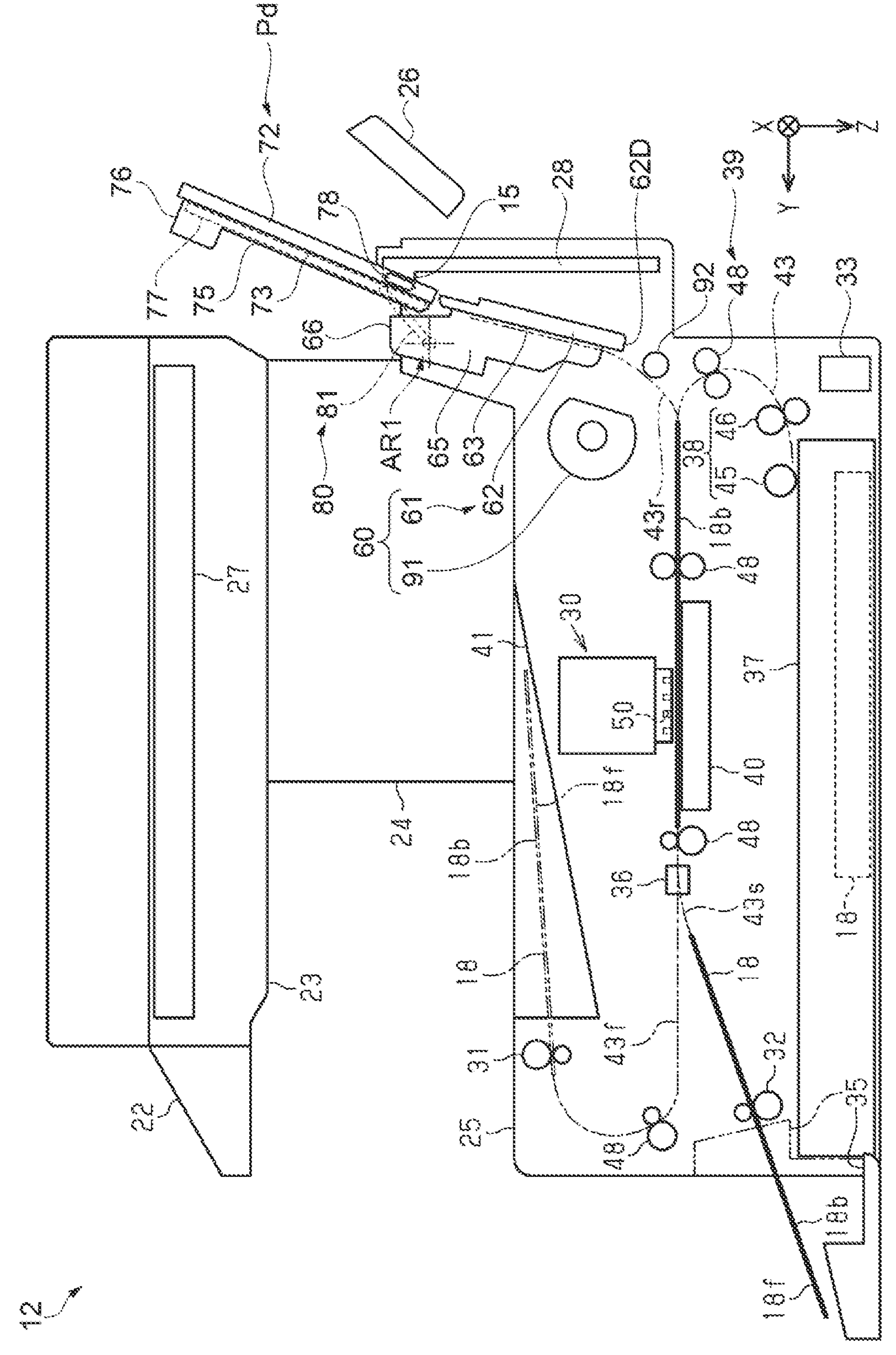
FIG. 2 is a schematic side view illustrating the recording device in which the auxiliary support part is in an expanded position.

As illustrated in FIGS. 1 and 2, the medium conveyance device 60 is provided at the back surface side of the device body 25 on the −Y direction side relative to the recording unit 30 in the device body 25. The medium conveyance device 60 includes the medium support tray 61 and a conveyance unit including feeding rollers 91 and 92. Hereinafter, the conveyance unit including the feeding rollers 91 and 92 is referred to as a conveyance unit FP. The medium conveyance device 60 conveys, along the feeding path 43*r* by the conveyance unit FP, the medium 18 (see FIG. 18) supported by the medium support tray 61. Hereinafter, of the direction where the medium 18 is conveyed, the direction to which the medium 18 is sent may be referred to as "downstream", and the opposite direction thereof may be referred to as "upstream". In the feeding path 43*r*, the direction to which the medium 18 supported by the medium support tray 61 is conveyed is referred to as a conveyance direction TD.

The downstream of the feeding path 43*r* joins with the conveyance path 43 at a position upstream of the medium support part 40 and the recording unit 30 of the conveyance path 43. The medium 18 conveyed along the feeding path 43*r* by the conveyance unit FP is conveyed toward the medium support part 40 and the recording unit 30 via the conveyance path 43. The medium 18 supported by the medium support tray 61 is conveyed by the conveyance unit FP, and recording is performed by the recording unit 30.

The medium support tray 61 includes a support part 62 that supports the medium 18, an auxiliary support part 72 that supports the medium 18 together with the support part 62, a side end guide part 65, an auxiliary side end guide part 75, and a coupling mechanism 80 including a lever 81. The support part 62 includes a support surface 63 on which the user can place the medium 18. The support surface 63 constituting the feeding path 43*r* is along the conveyance direction TD. The auxiliary support part 72 includes a support surface 73 on which the user can place the medium 18 at an expanded position Pd illustrated in FIGS. 2 and 16 to 18. At the expanded position Pd, the support surface 73 constituting the feeding path 43*r* is along the conveyance direction TD. The medium 18 supported by the support surfaces 63 and 73 is conveyed toward the medium support part 40 and the recording unit 30 by the conveyance unit FP.

The support part 62 is provided at the device body 25 rotatably about an axis AR1 along the X axis direction. As illustrated in FIGS. 4, 5, 9, and 10, the support part 62 includes a rotating shaft 68. The rotating shaft 68 is rotatably held by a holding part 14 of a frame 13 of the device body 25. The rotating shaft 68 includes a rotating shaft 68R having a cylindrical shape protruding in the −X direction from a side surface on the −X direction side of the support part 62 and a rotating shaft 68L having a cylindrical shape protruding in the +X direction from a side surface on the +X direction side of the support part 62.

Figure 5:
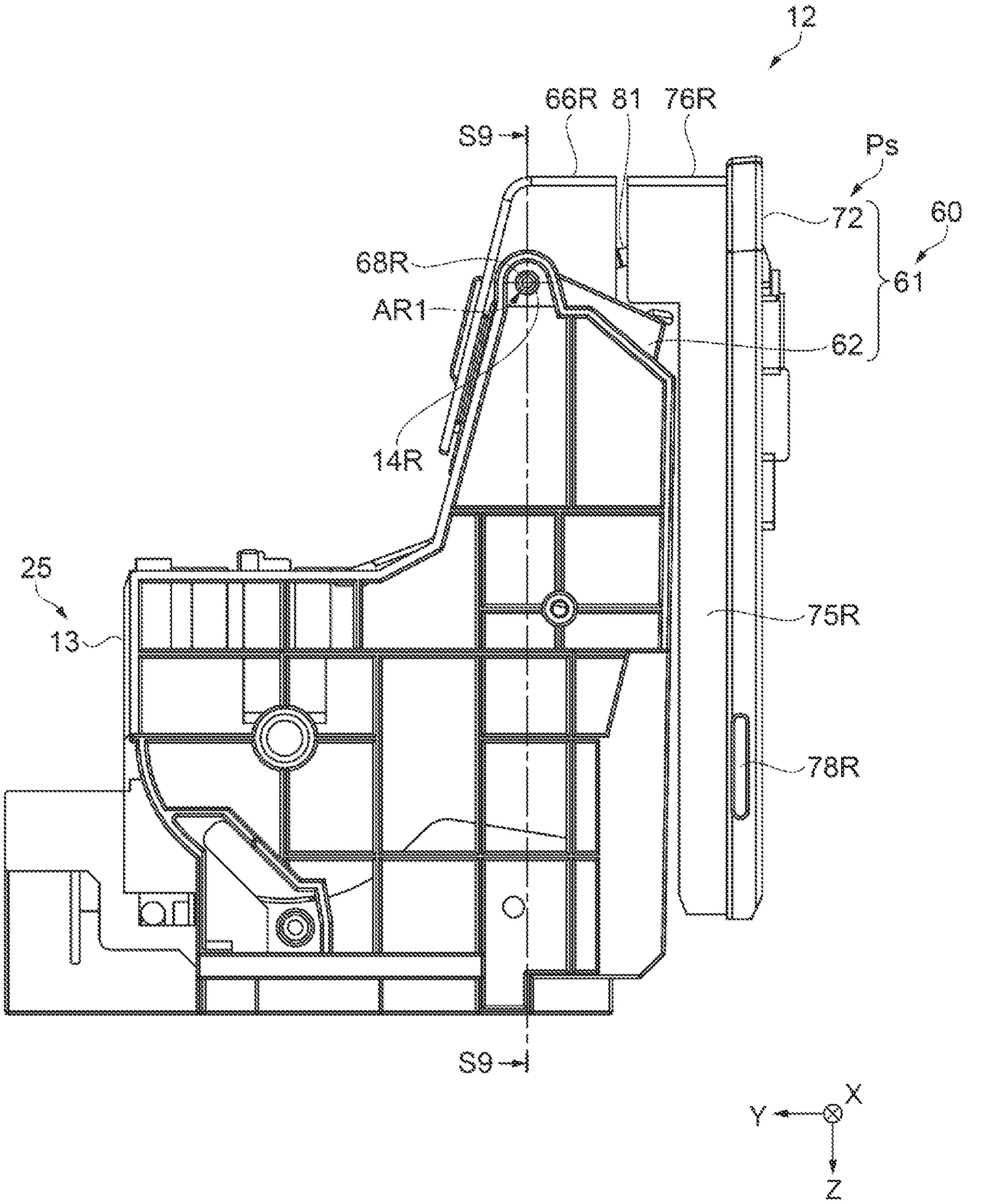
FIG. 5 is a schematic side view illustrating the medium support tray.
Figure 9:
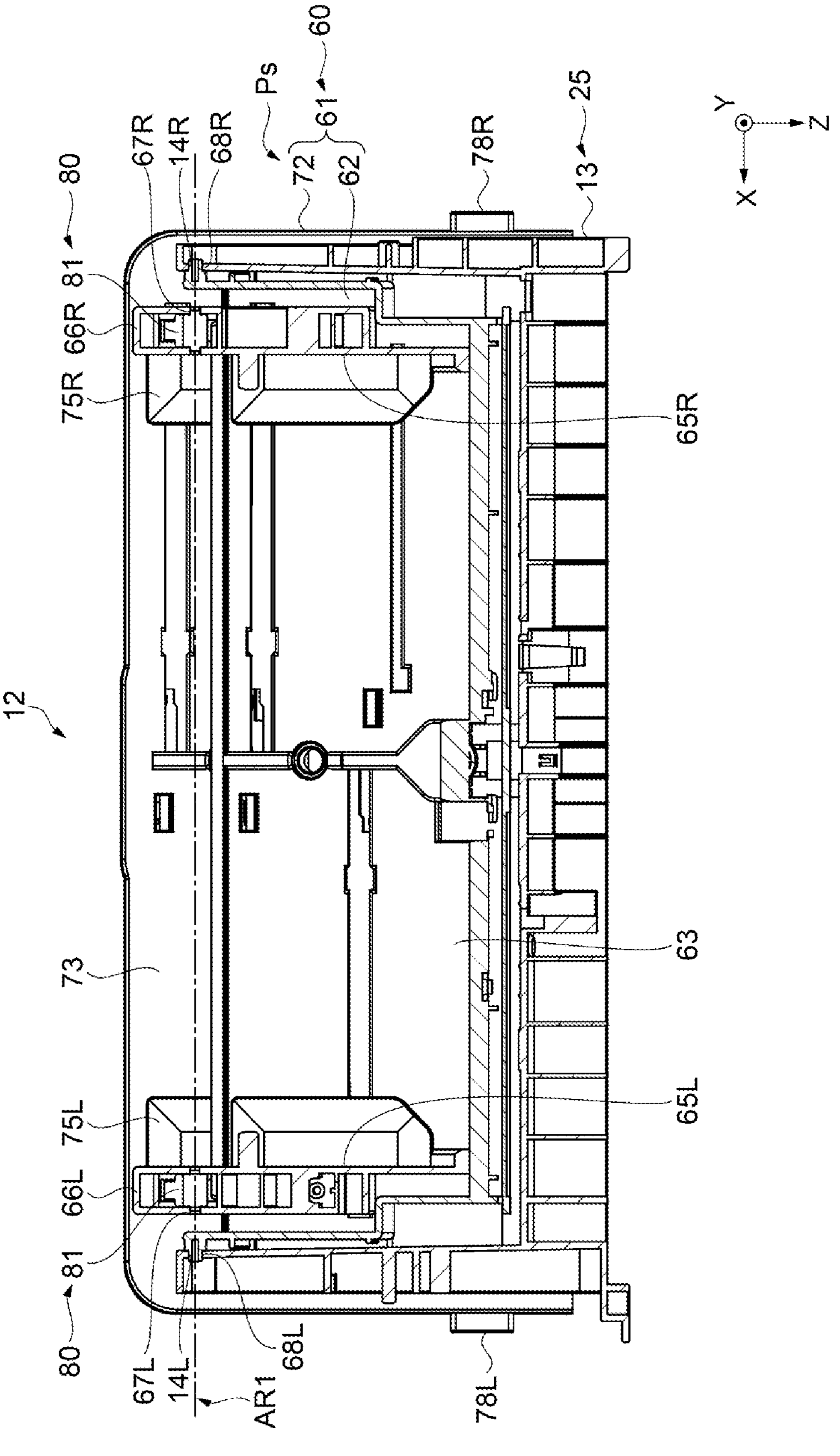
FIG. 9 is a cross-sectional view illustrating a cross section taken along S9-S9 illustrated in FIG. 5.
Figure 10:
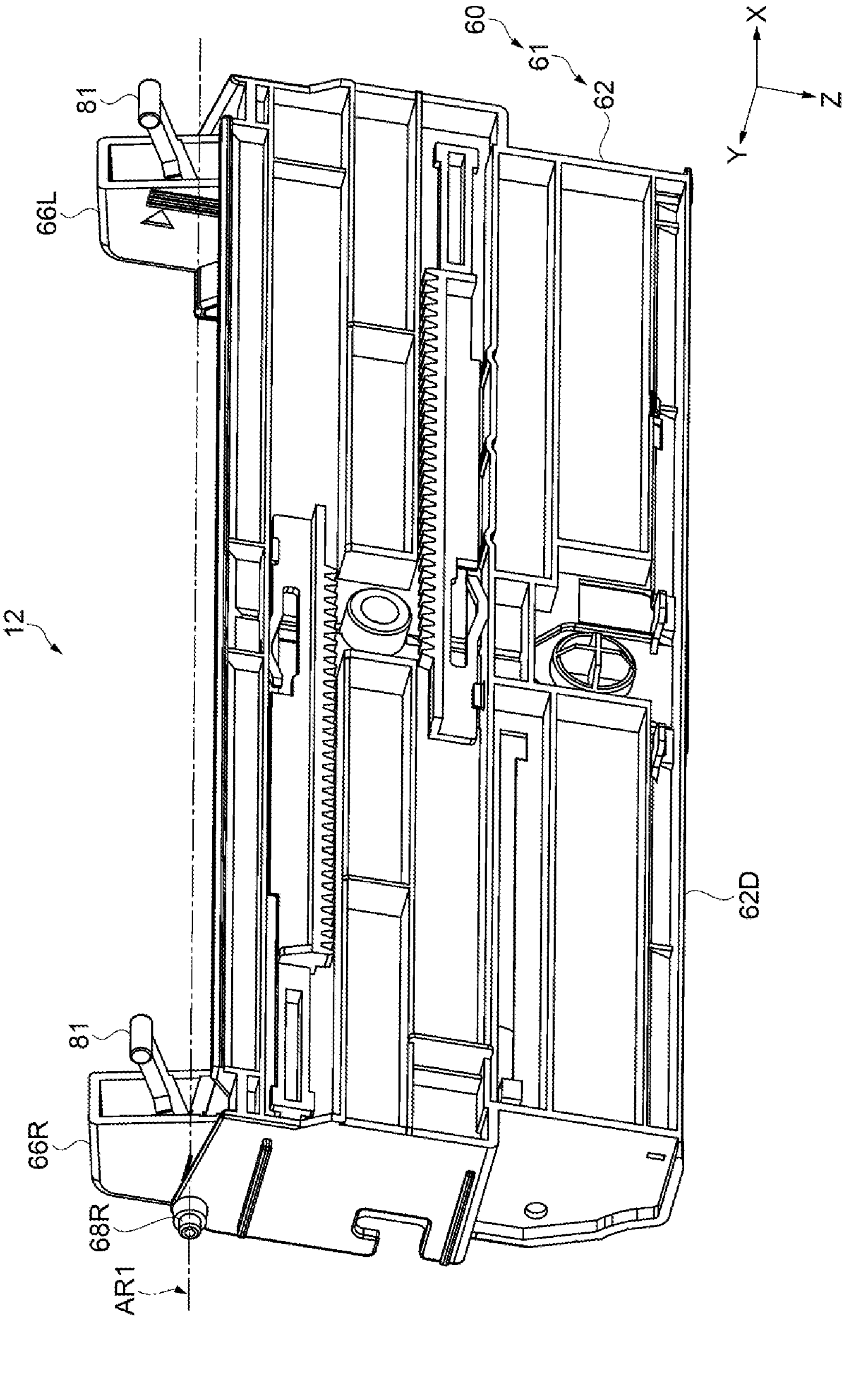
FIG. 10 is a schematic perspective view illustrating a support part.

As illustrated in FIGS. 5 and 9, the holding part 14 includes a holding part 14R, which is a through hole provided in the side surface on the −X direction side of the frame 13, and a holding part 14L, which is a through hole provided in the side surface on the +X direction side of the frame 13. The axis AR1 passes through the center of the holding part 14R and the center of the holding part 14L. When the rotating shaft 68R is inserted into the holding part 14R, and the rotating shaft 68L is inserted into the holding part 14L, the support part 62 is rotatably held by the frame 13 of the device body 25 about the axis AR1. Therefore, the rotating shaft 68 is provided at a position upstream of the support surface 63 in the conveyance direction TD from the axis AR1 illustrated in FIGS. 1 and 2.

The support part 62 includes a downstream end 62D at a position downstream of the rotating shaft 68 in the conveyance direction TD. When the support part 62 rotates, the downstream end 62D is displaced and moves forward and backward with respect to the feeding roller 91. When the downstream end 62D moves forward to the feeding roller 91, the supported medium 18 is pressed against the feeding roller 91, and the feeding roller 91 rotates in this state to feed the medium 18. On the support surfaces 63 and 73, a plurality of the media 18 can be placed in a stacked manner. The plurality of media 18 supported by the support surfaces 63 and 73 are separated one by one by the conveyance unit FP and conveyed toward the medium support part 40 and the recording unit 30.

The auxiliary support part 72 is provided at the device body 25 movably between a storage position Ps illustrated in FIGS. 1, 3 to 6, 8, 9, and 13 and an expanded position Pd illustrated in FIGS. 2 and 16 to 18. The storage position Ps is a position where the auxiliary support part 72 is stored in the device body 25. As illustrated in FIG. 1, the storage position Ps is located on the −Y direction side of the support part 62 in the device body 25. The expanded position Pd is a position where the auxiliary support part 72 supports the medium 18 together with the support part 62. As illustrated in FIG. 2, the expanded position Pd is a position upstream of the support part 62 in the conveyance direction TD of the medium 18.

As illustrated in FIGS. 1 and 2, the device body 25 is provided with an opening and closing cover 26. The opening and closing cover 26 is movable to a close position where the −Z direction side of the support part 62 and the auxiliary support part 72 at the storage position Ps is covered, and an open position where the auxiliary support part 72 is drawable from the storage position Ps to the expanded position Pd.

Figure 11:
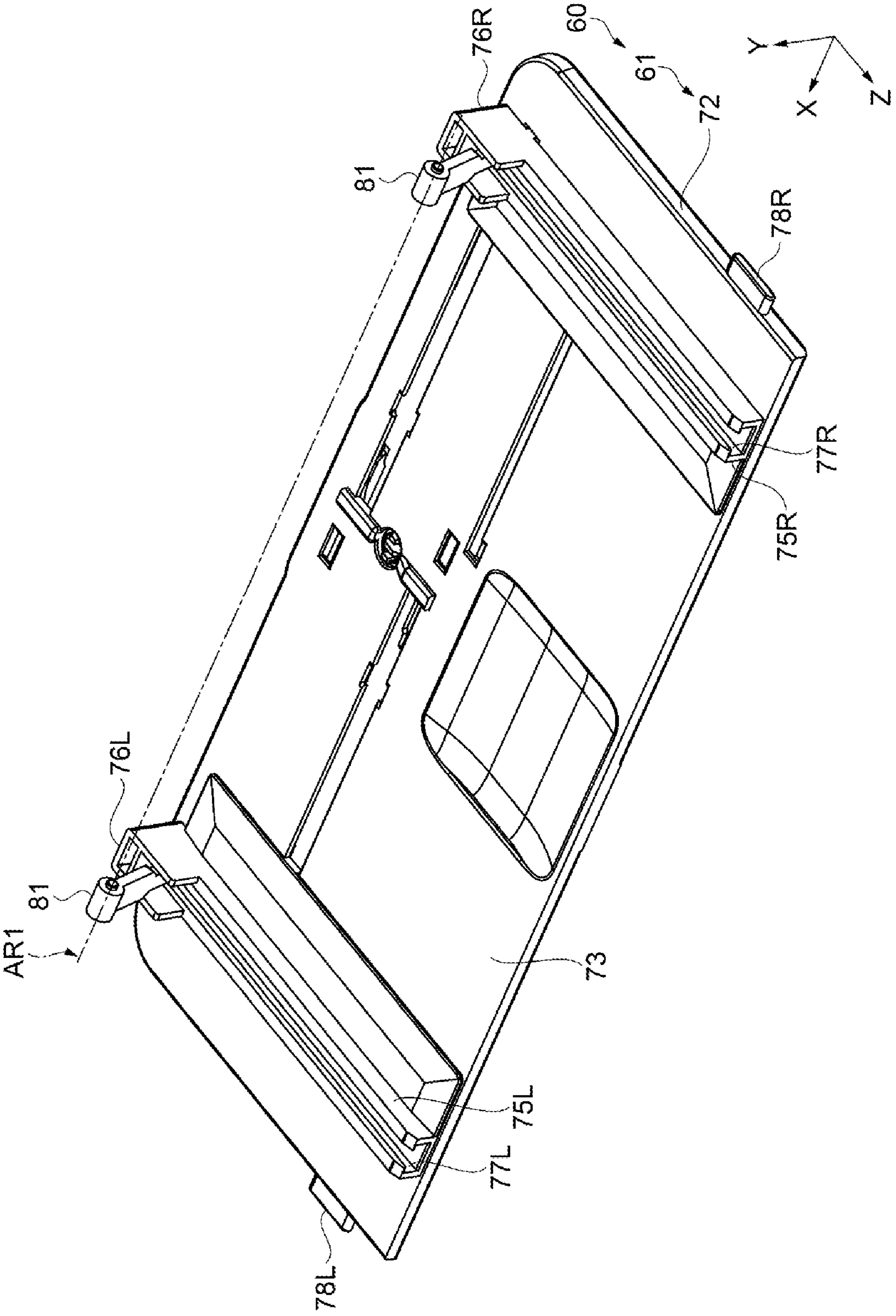
FIG. 11 is a schematic perspective view illustrating the auxiliary support part.
Figure 12:
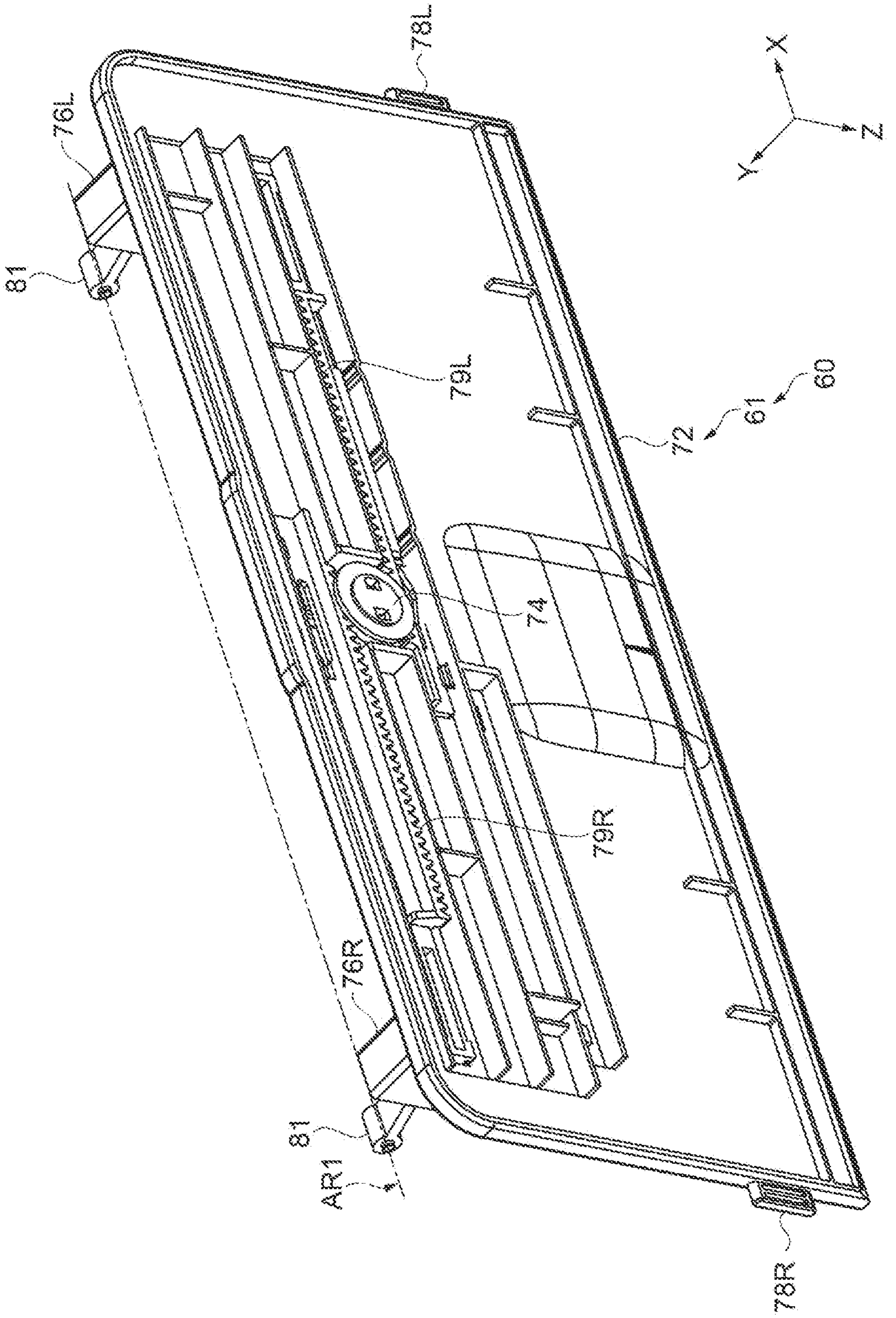
FIG. 12 is a schematic perspective view illustrating the auxiliary support part.

The auxiliary support part 72 includes a slider 78 guided by a guide groove 28 and a lock groove 15 (See FIGS. 2, 13, 14, and 16) of the device body 25. As illustrated in FIGS. 11 and 12, the slider 78 includes a slider 78R having a plate shape protruding in the −X direction from a side surface on the −X direction side of the auxiliary support part 72 and a slider 78L having a plate shape protruding in the +X direction from a side surface on the +X direction side of the auxiliary support part 72. The device body 25 is provided with a pair of the guide groove 28 and the lock groove 15 corresponding to the sliders 78R and 78L.

Figure 13:
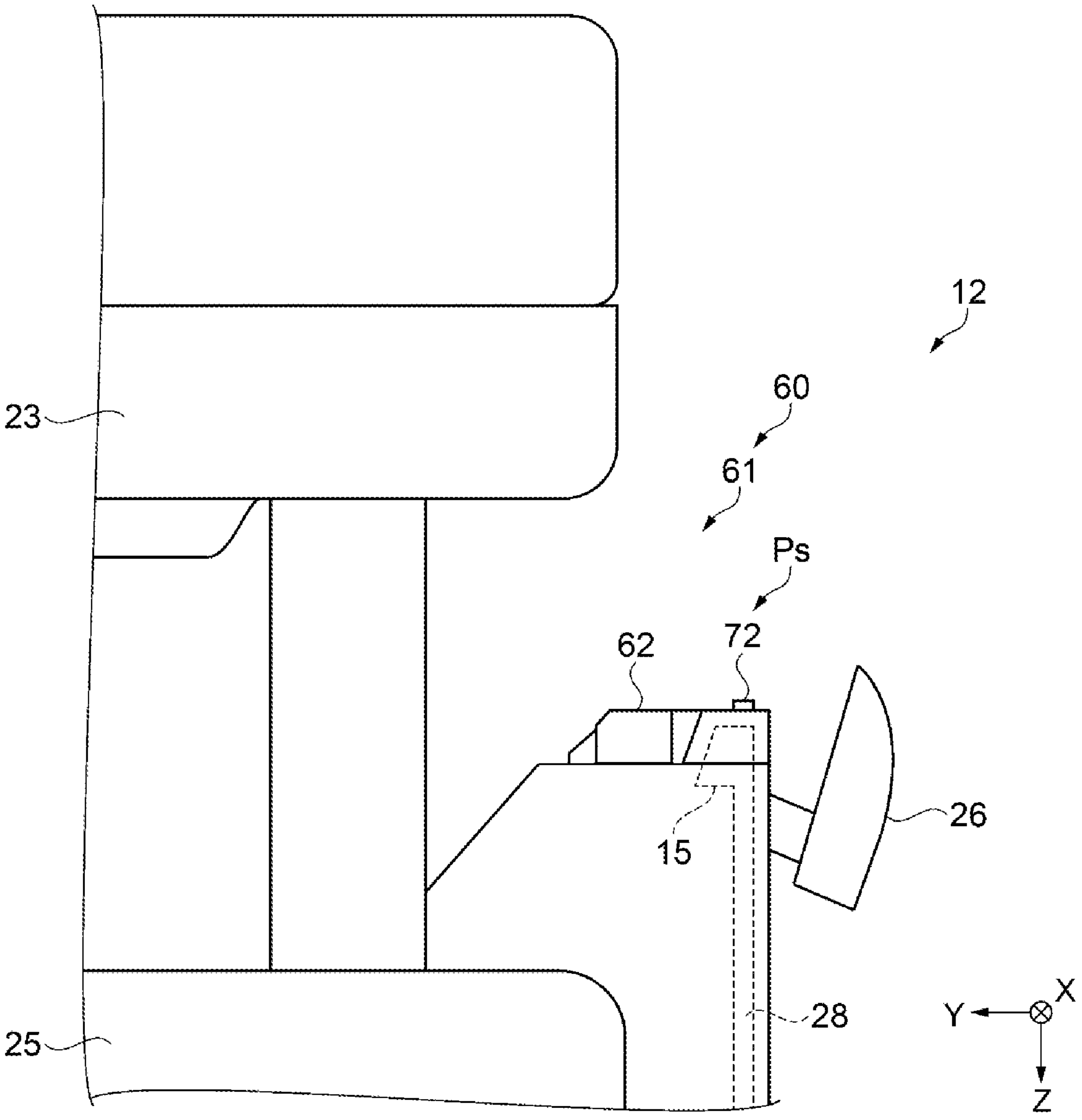
FIG. 13 is a schematic side view describing expansion of the auxiliary support part to the expanded position.
Figure 14:
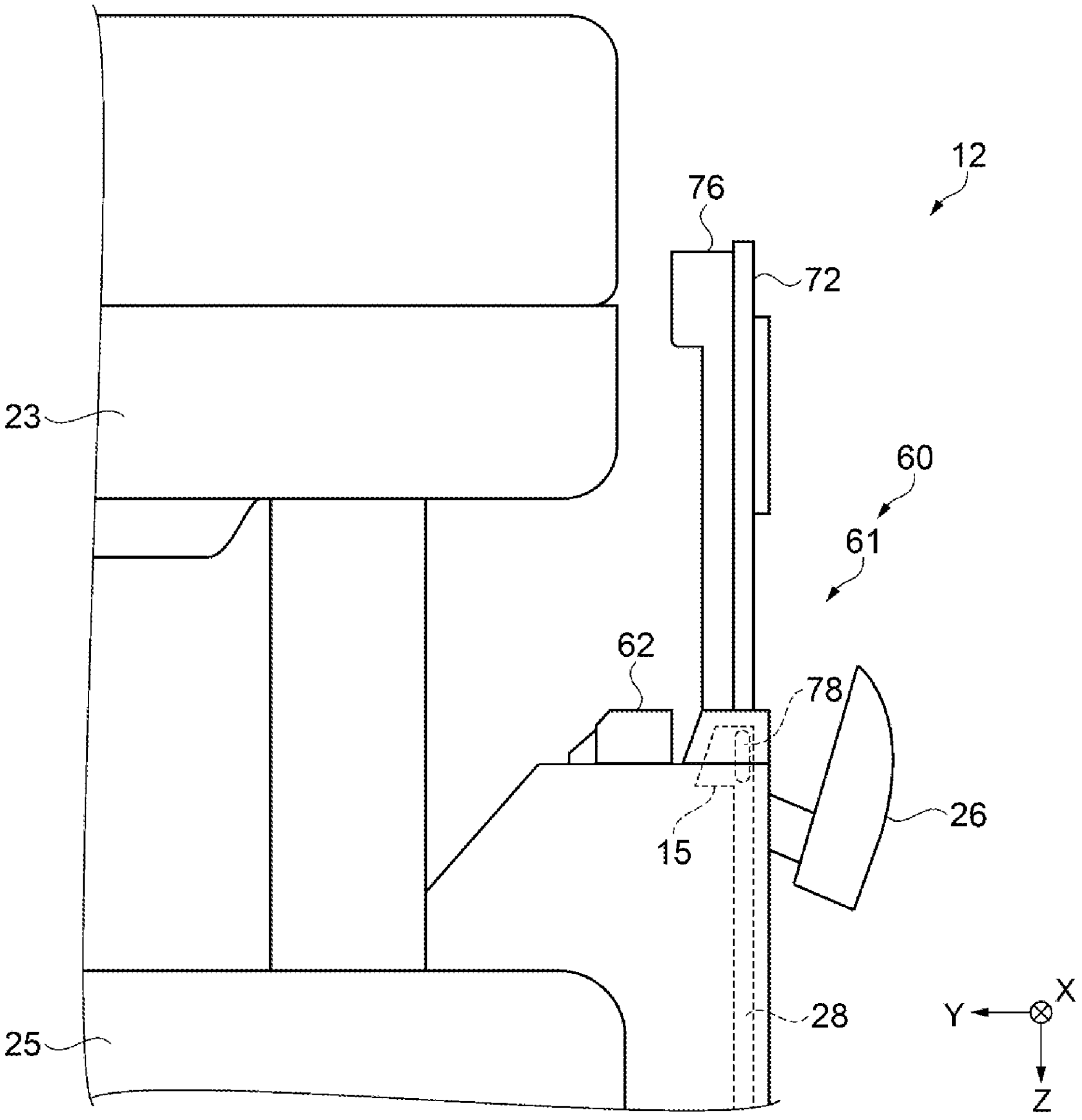
FIG. 14 is a schematic side view describing expansion of the auxiliary support part to the expanded position.
Figure 15:
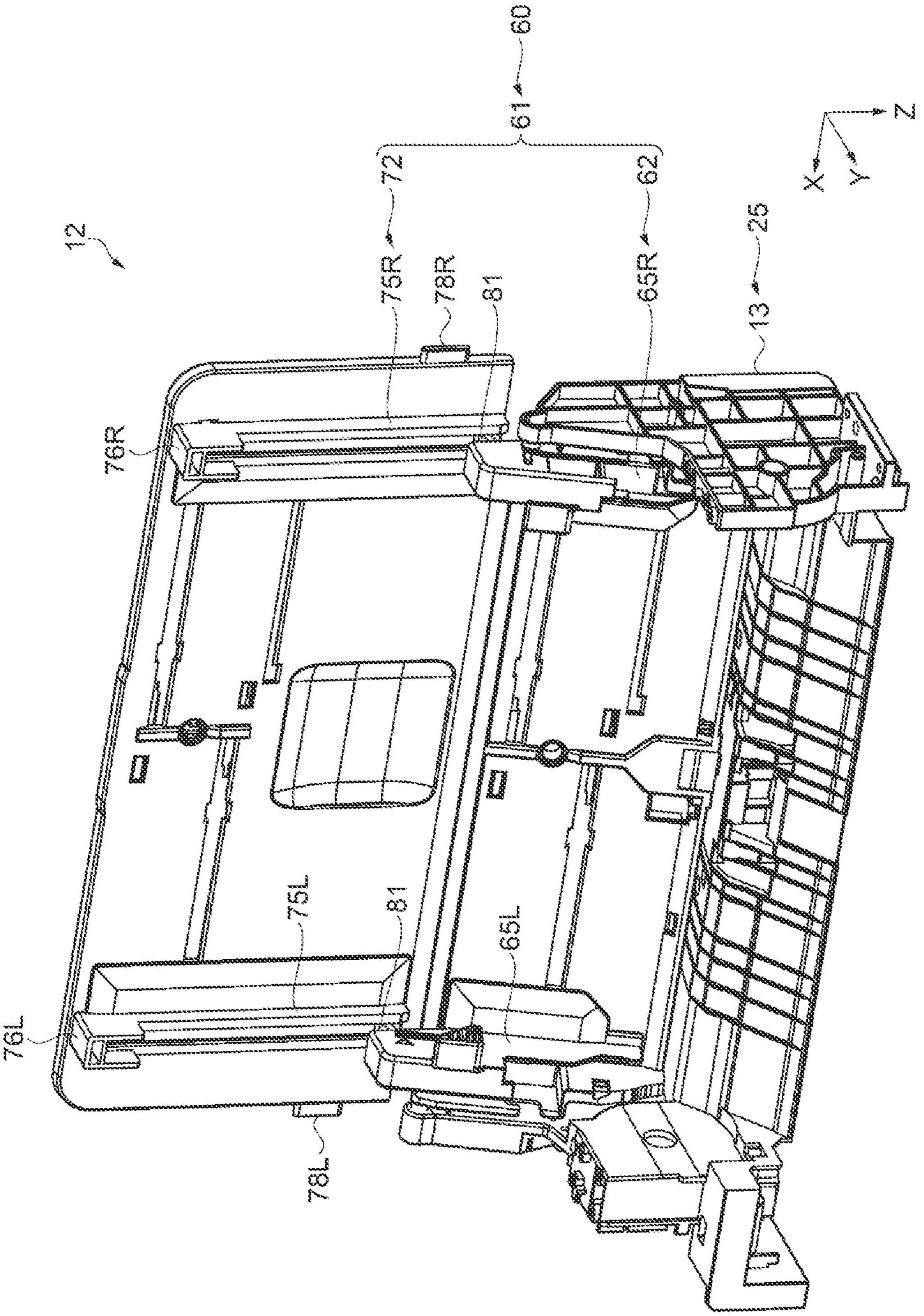
FIG. 15 is a schematic perspective view describing expansion of the auxiliary support part to the expanded position.
Figure 16:
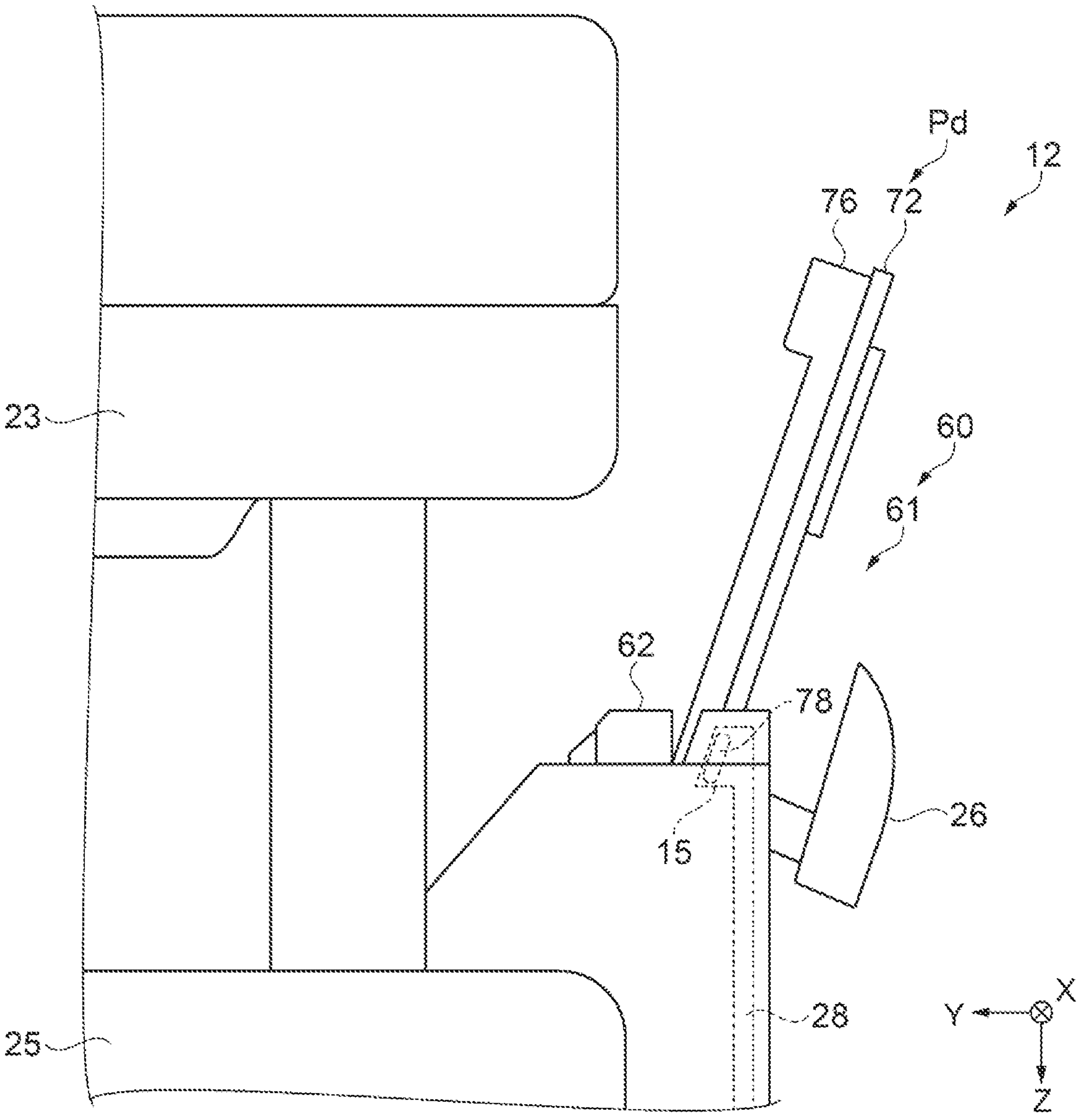
FIG. 16 is a schematic side view describing expansion of the auxiliary support part to the expanded position.

For example, when the auxiliary support part 72 is moved from the storage position Ps to the expanded position Pd, the user moves the opening and closing cover 26 from the close position illustrated in FIG. 1 to the opening position illustrated in FIGS. 2 and 13. Then, the user grips an end on the upper side of the auxiliary support part 72, and draws out the auxiliary support part 72 in the −Z direction, which is vertically upward, from the storage position Ps. Then, as illustrated in FIG. 14, the slider 78 comes into contact with an upper end, which is an end on the −Z direction side of the guide groove 28. This regulates vertically upward movement of the slider 78. Then, when the user moves the end on the upper side of the auxiliary support part 72 in the −Y direction, the auxiliary support part 72 rotates from the vertical posture to the inclined posture. When the auxiliary support part 72 rotates, as illustrated in FIG. 16, the slider 78 is fitted into the lock groove 15, and the auxiliary support part 72 is fixed to the expanded position Pd.

Figure 3:
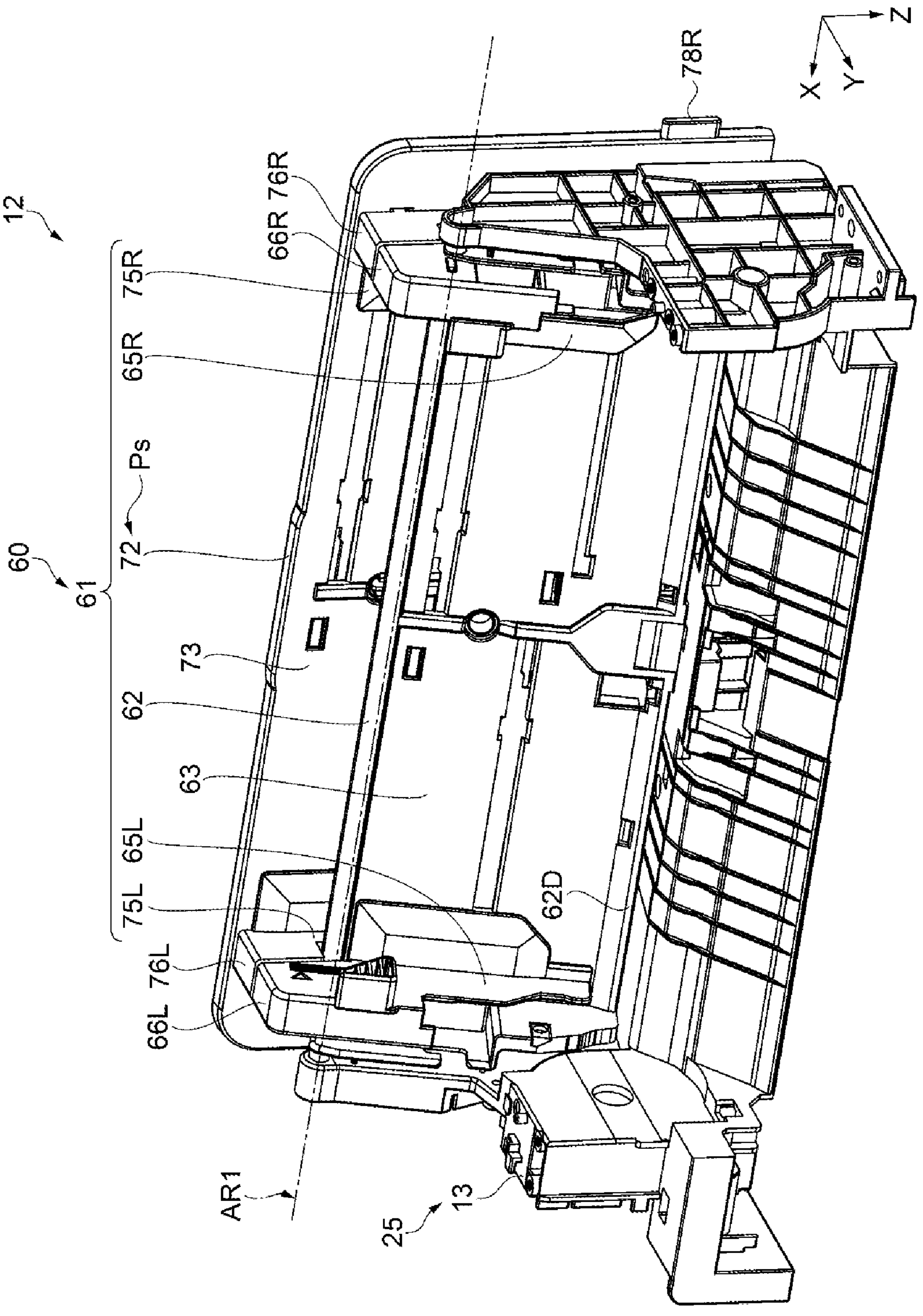
FIG. 3 is a schematic perspective view illustrating a medium support tray.
Figure 4:
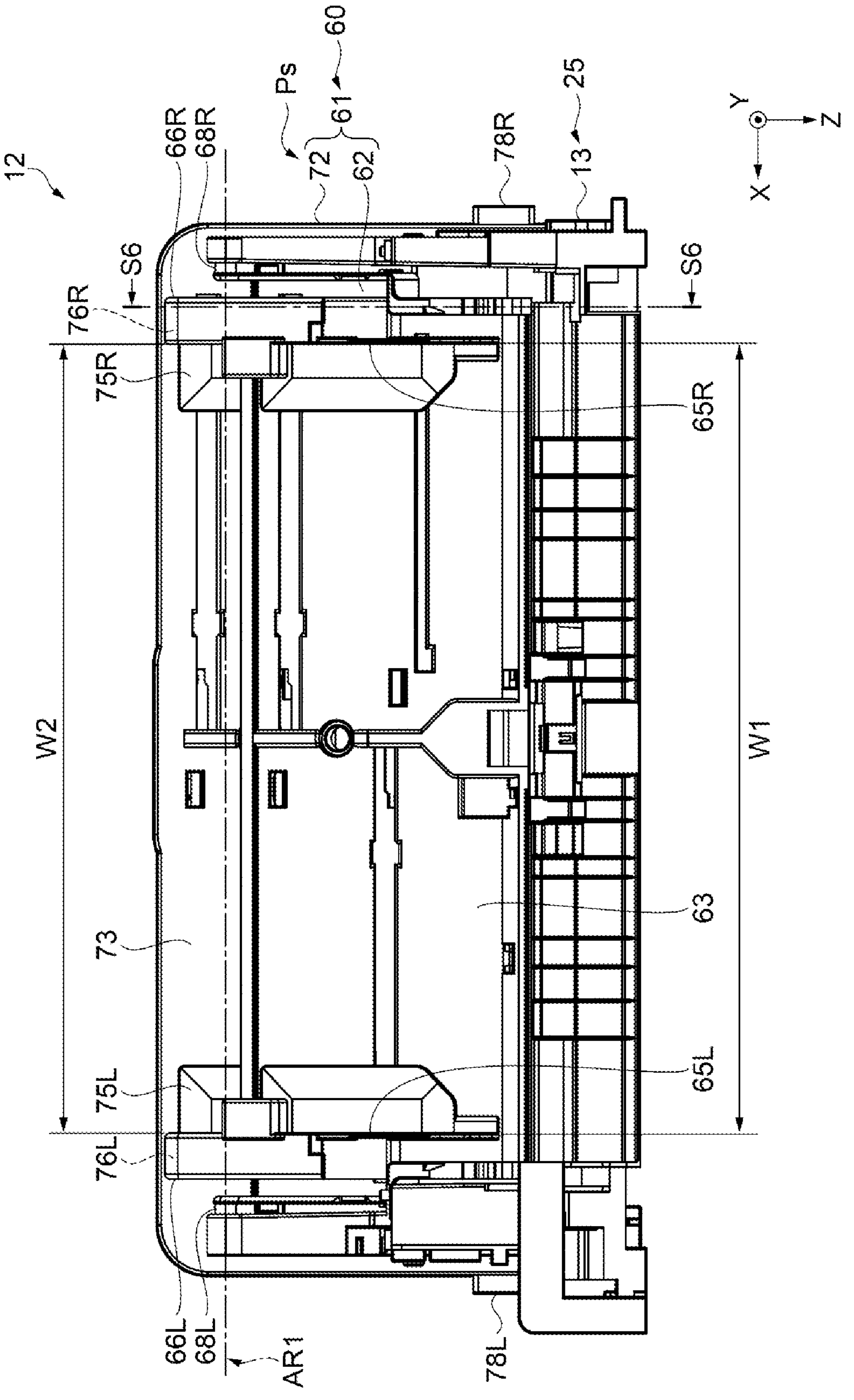
FIG. 4 is a schematic front view illustrating the medium support tray.

The side end guide part 65 is provided at the support part 62 movably in the X axis direction. The X axis direction is an example of the width direction WD of the medium 18 intersecting the conveyance direction TD, and is an example of the width direction of the support surfaces 63 and 73. The side end guide part 65 extends over the support surface 63 along the conveyance direction TD. As illustrated in FIGS. 3 and 4, the side end guide part 65 includes a side end guide part 65R and a side end guide part 65L located on the +X direction side of the side end guide part 65R.

Figure 17:
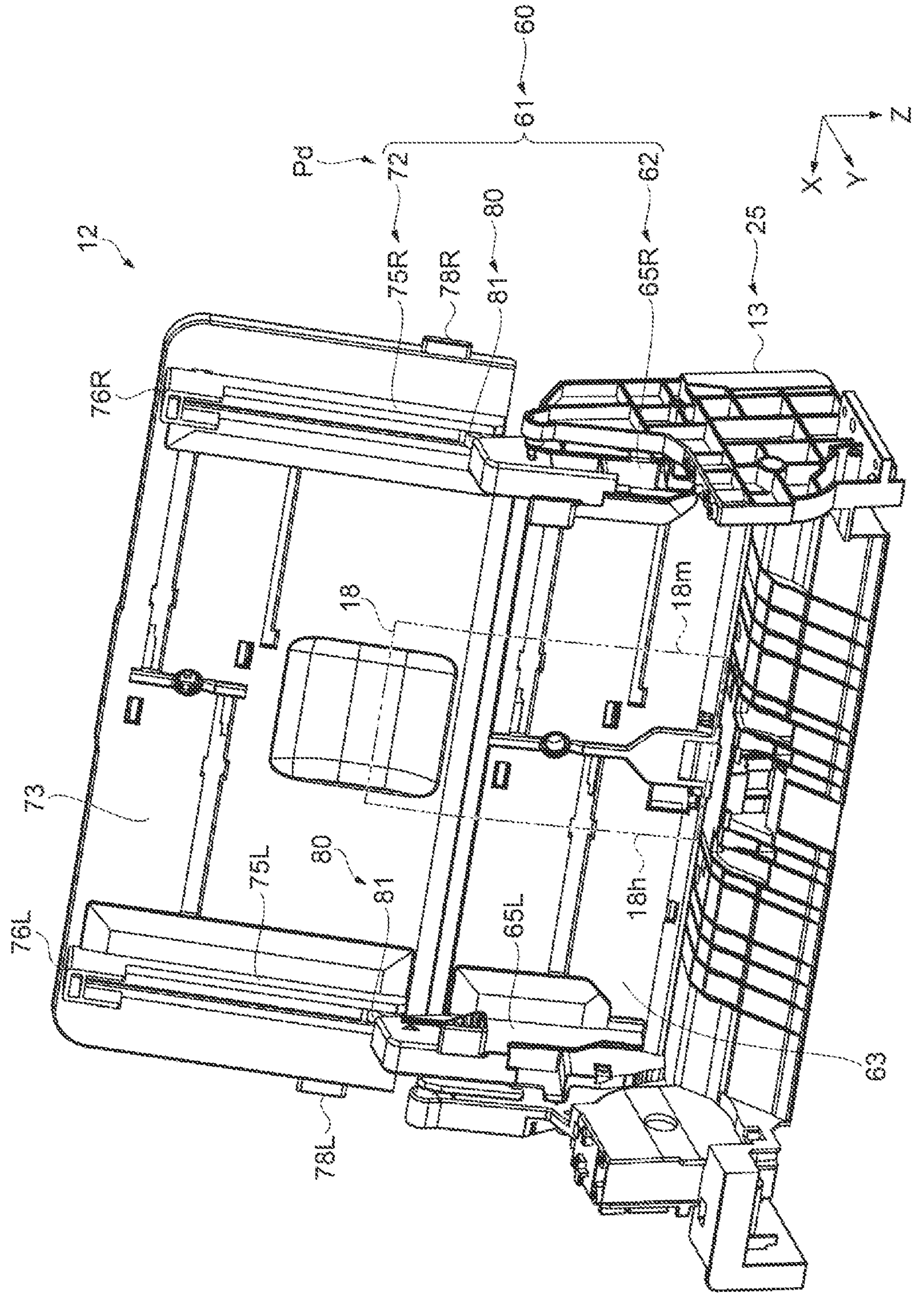
FIG. 17 is a schematic perspective view illustrating the medium support tray in which the auxiliary support part is in the expanded position.
Figure 18:
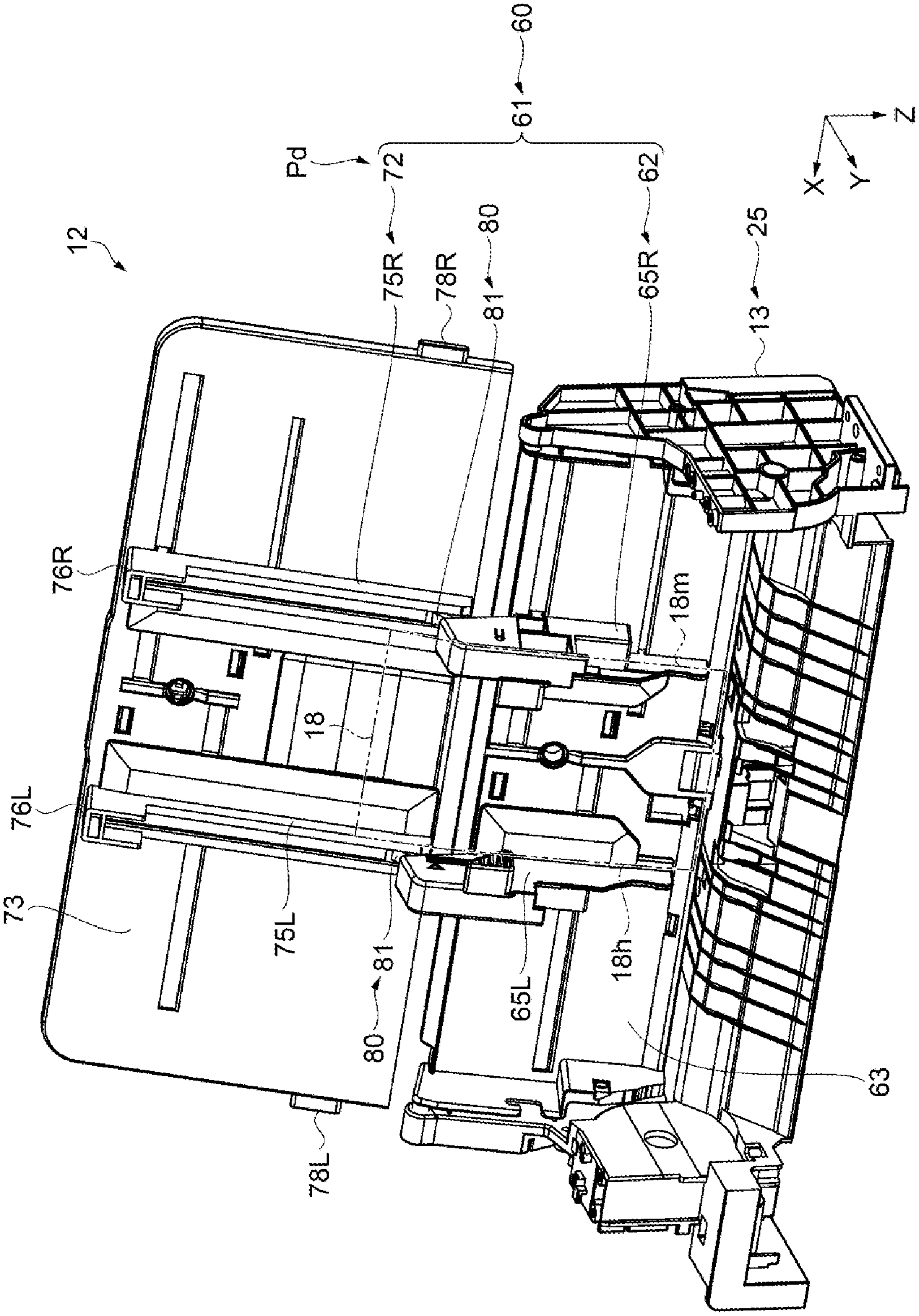
FIG. 18 is a schematic perspective view illustrating the medium support tray in a state where a side end guide part and an auxiliary side end guide part are moved.

For example, as illustrated in FIGS. 17 and 18, an end on the −X direction side of the medium 18 supported by the support surfaces 63 and 73 is a side end 18*m*, and an end on the +X direction side of the medium 18 is a side end 18*h*. At this time, as illustrated in FIG. 18, the side end guide part 65R regulates movement of the side end 18*m* in the −X direction by the side surface on the +X direction side coming into contact with the side end 18*m* of the medium 18. The side end guide part 65L regulates movement of the side end 18*h* in the +X direction by the side surface on the −X direction side coming into contact with the side end 18*h* of the medium 18. Thus, the side end guide part 65 regulates the position in the X axis direction of the medium 18.

As illustrated in FIGS. 1 and 2, the side end guide part 65 is provided with a protrusion part 66 protruding upward from an upstream end in the conveyance direction TD of the support part 62. As illustrated in FIG. 3, the protrusion part 66 includes a protrusion part 66R provided at the side end guide part 65R and a protrusion part 66L provided at the side end guide part 65L. As illustrated in FIGS. 6 and 8 to 10, the protrusion parts 66R and 66L are provided with spaces for holding the rotating shaft 83 side of the lever 81.

Figure 7:
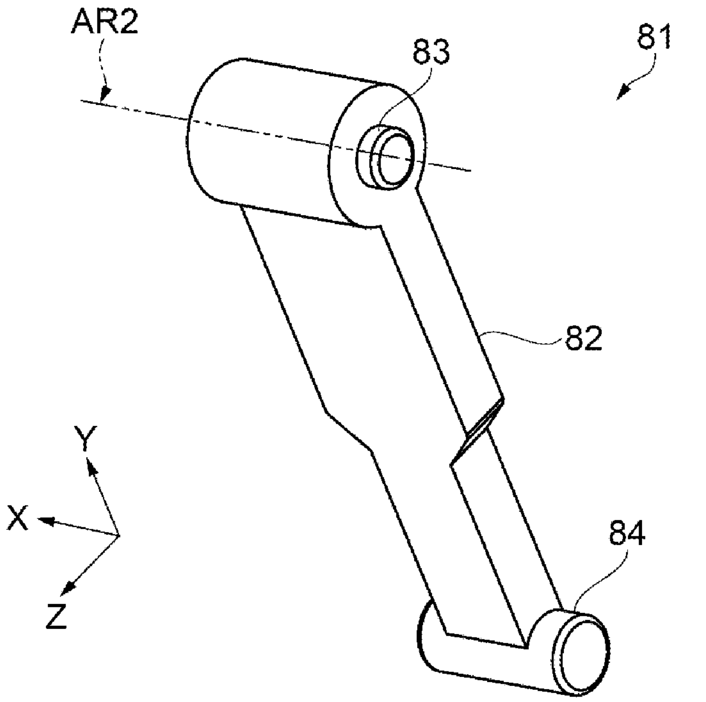
FIG. 7 is a perspective view illustrating a lever.

Here, the lever 81 will be described. As illustrated in FIG. 7, the lever 81 includes the rotating shaft 83, a sliding part 84, and a coupling part 82 having a plate shape coupling the rotating shaft 83 and the sliding part 84. The rotating shaft 83 includes a base part having a columnar shape and convex parts protruding from the base part to both sides in a direction along a central axis AR2 of the base part. The convex part of the rotating shaft 83 has a columnar shape having a smaller diameter than that of the base part with the central axis AR2 as the central axis. The sliding part 84 has a columnar shape extending in a direction along the central axis AR2. Of the columnar shape of the sliding part 84, the protrusion parts protruding from the coupling part 82 to both sides in the direction along the central axis AR2 are fitted to guiding parts 77R and 77L of auxiliary side end guide parts 75R and 75L described later.

The description returns to the protrusion parts 66R and 66L of the side end guide parts 65R and 65L. As illustrated in FIG. 9, both side surfaces in the X axis direction of the protrusion parts 66R and 66L are provided with engagement parts 67R and 67L with which the convex parts of the rotating shaft 83 of the lever 81 are engaged. When the convex parts of the rotating shaft 83 are engaged with the engagement parts 67R and 67L, the lever 81 is held by the side end guide parts 65R and 65L displaceably with respect to the side end guide parts 65R and 65L.

In the present embodiment, the convex parts of the rotating shaft 83 are engaged with the engagement parts 67R and 67L, whereby the lever 81 is rotatably held by the side end guide parts 65R and 65L about the axis AR1. The lever 81 is displaced with respect to the side end guide parts 65R and 65L by rotating about the axis AR1. Inner side surfaces in the X axis direction forming the spaces of the protrusion parts 66R and 66L are brought into contact with both side surfaces in the X axis direction of the base part of the rotating shaft 83. This regulates the lever 81 from moving in the X axis direction with respect to the side end guide parts 65R and 65L. In other words, the lever 81 is held by the side end guide parts 65R and 65L displaceably with respect to the side end guide parts 65R and 65L as viewed in the direction along the axis AR1.

The auxiliary side end guide part 75 is provided at the auxiliary support part 72 movably in the X axis direction. As illustrated in FIG. 2, the auxiliary side end guide part 75 has a rod shape extending over the support surface 73 along the conveyance direction TD. As illustrated in FIG. 11, the auxiliary side end guide part 75 includes the auxiliary side end guide part 75R and the auxiliary side end guide part 75L located on the +X direction side of the auxiliary side end guide part 75R. As illustrated in FIG. 18, the auxiliary side end guide part 75R regulates movement of the side end 18*m* in the −X direction by the side surface on the +X direction side coming into contact with the side end 18*m* of the medium 18. The auxiliary side end guide part 75L regulates movement of the side end 18*h* in the +X direction by the side surface on the −X direction side coming into contact with the side end 18*h* of the medium 18. Thus, the auxiliary side end guide part 75 regulates the position in the X axis direction of the medium 18.

The auxiliary side end guide part 75R is an example of a first guide part, and the auxiliary side end guide part 75L is an example of a second guide part. In this case, the side end

18*m* is an example of one side end regulated by the first guide part of the side ends of the medium 18. In this case, the side end 18*h* is an example of the other side end regulated by the second guide part of the side ends of the medium 18.

Figure 6:
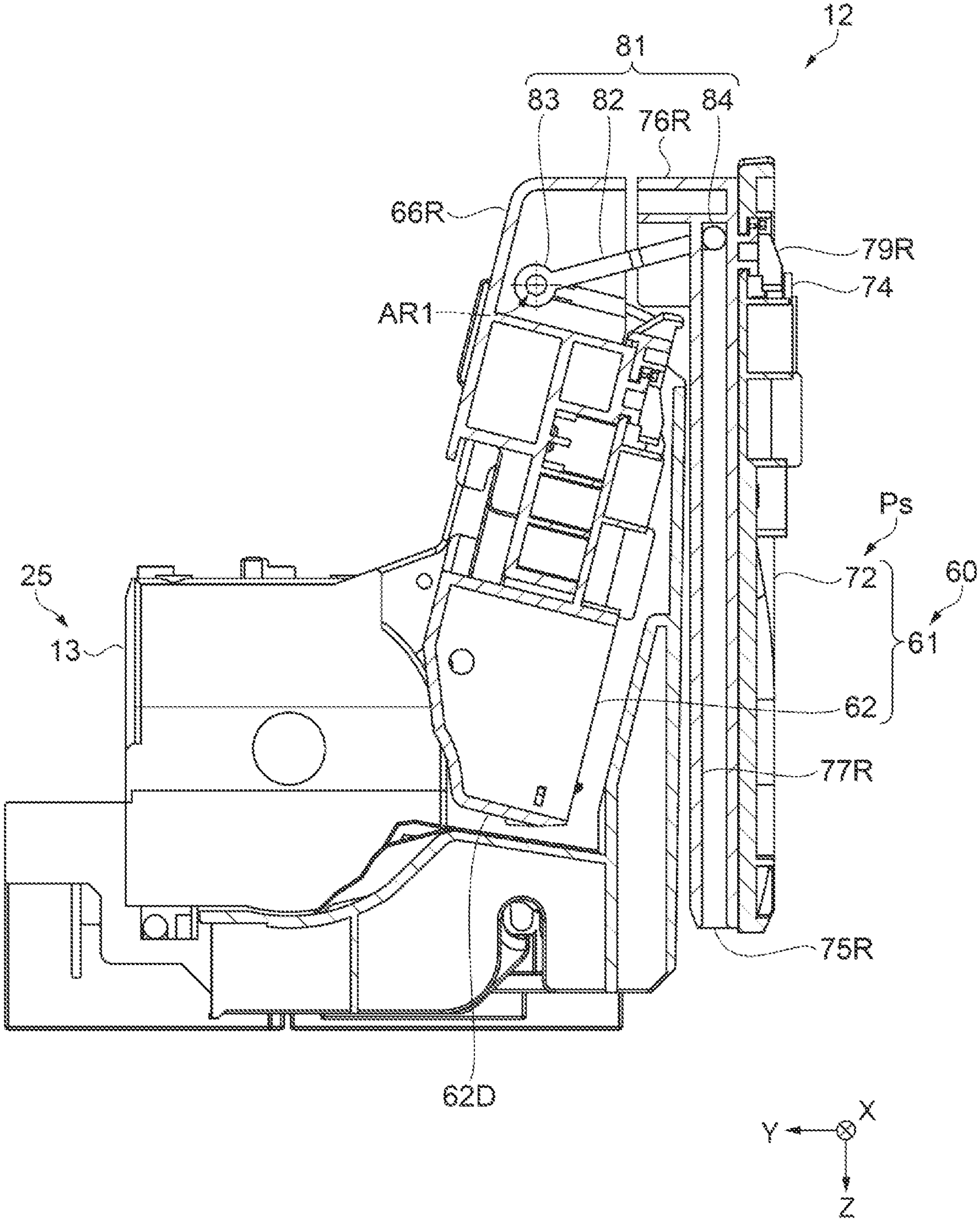
FIG. 6 is a cross-sectional view illustrating a cross section taken along S6-S6 illustrated in FIG. 4.
Figure 8:
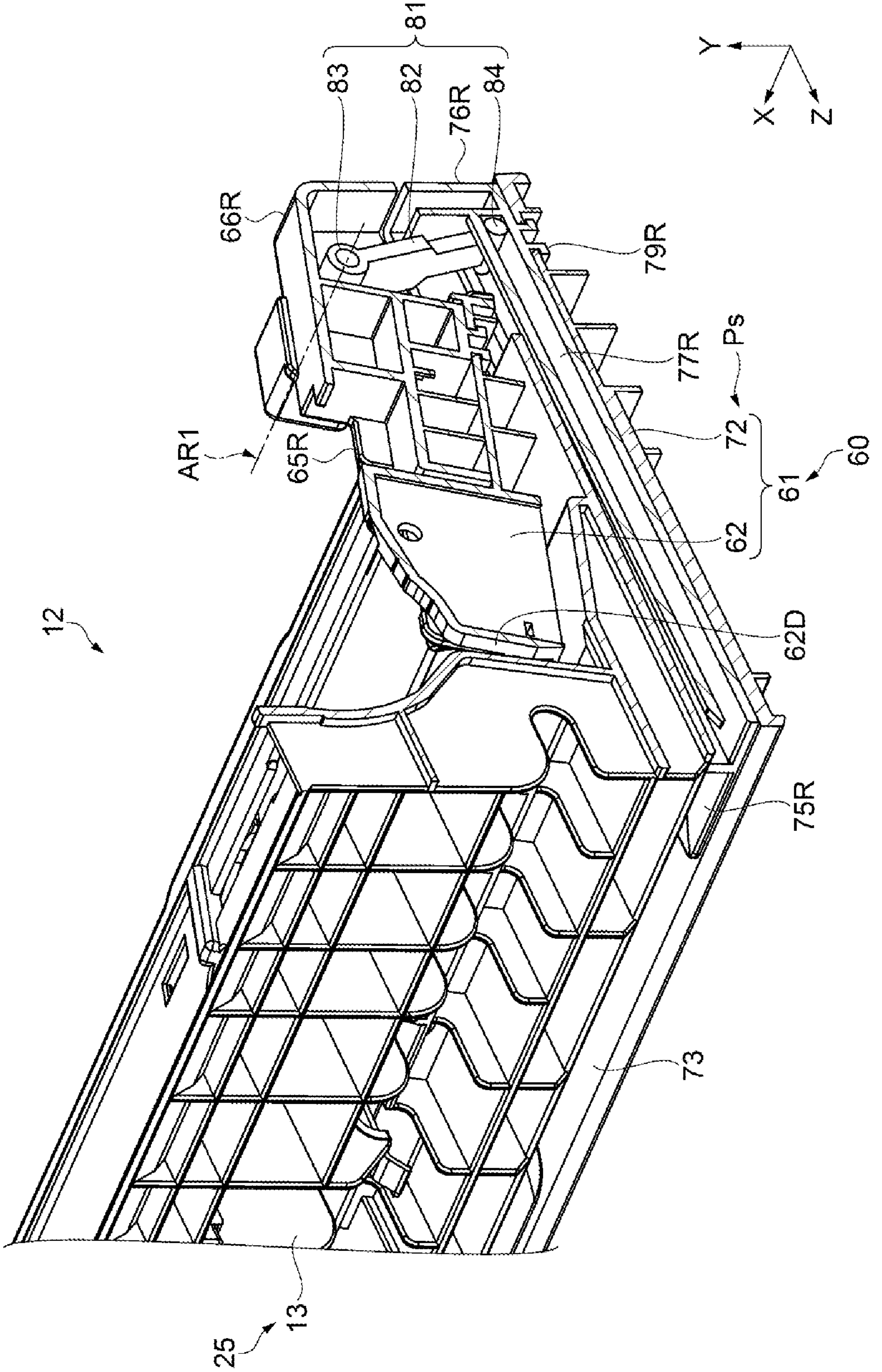
FIG. 8 is a cross-sectional perspective view illustrating the cross section taken along S6-S6 illustrated in FIG. 4.

As illustrated in FIGS. 6, 8, and 11, the auxiliary side end guide parts 75R and 75L are provided with the guiding parts 77R and 77L to which the sliding part 84 of the lever 81 is slidably fitted. The guiding parts 77R and 77L are grooves extending over the auxiliary side end guide parts 75R and 75L along the conveyance direction TD. The grooves as the guiding parts 77R and 77L include opening parts extending over the auxiliary side end guide parts 75R and 75L along the conveyance direction TD and rail parts. The opening parts of the guiding parts 77R and 77L open to the side facing the support part 62 at the storage position Ps. The rail parts of the guiding parts 77R and 77L are continuous from the opening parts and have rectangular shapes having widths larger than the widths in the X axis direction of the opening parts.

When the sliding part 84 of the lever 81 is fitted to the rail parts of the guiding parts 77R and 77L, the support part 62 and the auxiliary support part 72 are coupled via the side end guide parts 65R and 65L, the lever 81, and the auxiliary side end guide parts 75R and 75L. The sliding part 84 of the lever 81 is slidably fitted to the rail parts of the guiding parts 77R and 77L. Therefore, the rail parts of the guiding parts 77R and 77L slide with respect to the sliding part 84 of the lever 81, whereby the auxiliary support part 72 is expanded with respect to the support part 62 in a state of being coupled to the support part 62.

The coupling mechanism 80 includes the engagement parts 67R and 67L of the side end guide parts 65R and 65L, the lever 81, and the guiding parts 77R and 77L of the auxiliary side end guide parts 75R and 75L. In other words, the side end guide parts 65R and 65L provided at the support part 62 expandably guide the auxiliary support part 72 via the coupling mechanism 80 and the auxiliary side end guide parts 75R and 75L.

The side end guide part 65R and the auxiliary side end guide part 75R are coupled by the coupling mechanism 80, whereby the side end guide part 65R moves in the X axis direction in conjunction with the movement in the X axis direction of the auxiliary side end guide part 75R. The side end guide part 65L and the auxiliary side end guide part 75L are coupled by the coupling mechanism 80, whereby the side end guide part 65L moves in the X axis direction in conjunction with the movement in the X axis direction of the auxiliary side end guide part 75L.

When the lever 81 is slidably fitted to the guiding part 77, the lever 81 is regulated from moving in the X axis direction with respect to the guiding part 77 by either the opening part or the rail part of the guiding part 77. By this, the side end guide part 65R is regulated from moving in the X axis direction with respect to the auxiliary side end guide part 75R. The side end guide part 65L is regulated from moving in the X axis direction with respect to the auxiliary side end guide part 75L. As illustrated in FIG. 4, the side surfaces on the +X direction side that regulate the position of the side end 18*m* of the medium 18 in the side end guide part 65R and the auxiliary side end guide part 75R have the same position in the X axis direction. The side surfaces on the −X direction side that regulate the position of the side end 18*h* of the medium 18 in the side end guide part 65L and the auxiliary side end guide part 75L have the same position in the X axis direction.

The side surfaces on the +X direction side of the side end guide part 65R and the auxiliary side end guide part 75R have the same position in the X axis direction also at the expanded position Pd. The side surfaces on the −X direction side of the side end guide part 65L and the auxiliary side end guide part 75L have the same position in the X axis direction also at the expanded position Pd. Therefore, at the storage position Ps and the expanded position Pd, a dimension W1 in the X axis direction and a dimension W2 in the X axis direction illustrated in FIG. 4 are the same. The side end guide parts 65R and 65L and the auxiliary side end guide parts 75R and 75L are provided at the medium support tray 61 movably in the X axis direction while maintaining a state in which the dimension W1 and the dimension W2 are equal.

As illustrated in FIGS. 1 and 2, the auxiliary side end guide part 75 is provided with an operation part 76. The operation part 76 is a projection provided at the upper end of the auxiliary side end guide part 75 that is the drawing direction side of the auxiliary support part 72. When the auxiliary support part 72 is at the expanded position Pd, the user grips the operation part 76 and moves it in the X axis direction, whereby the user can move the auxiliary side end guide part 75 and the side end guide part 65 in the X axis direction. In the present embodiment, as illustrated in FIGS. 3, 11, 15, 17, and 18, the auxiliary side end guide part 75R is provided with an operation part 76R, and the auxiliary side end guide part 75L is provided with an operation part 76L.

The auxiliary side end guide part 75R and the auxiliary side end guide part 75L are engaged with each other via a rack-and-pinion mechanism. Specifically, as illustrated in FIGS. 6, 8, and 12, the side of the auxiliary support part 72 opposite to the support surface 73 is provided with a gear 74, a first rack 79R, and a second rack 79L constituting the rack-and-pinion mechanism. The gear 74 meshing with the first rack 79R and the second rack 79L is provided at the center of the auxiliary support part 72 in the X axis direction. The gear 74 is provided at a position close to the operation part 76 that is upstream of the center of the auxiliary support part 72 in the conveyance direction TD. The first rack 79R is provided at the auxiliary side end guide part 75R, and extends in the +X direction from the auxiliary side end guide part 75R toward the gear 74. The second rack 79L is provided at the auxiliary side end guide part 75L, and extends in the −X direction from the auxiliary side end guide part 75L toward the gear 74.

The gear 74 may be provided at a position where the center of the rotation shaft of the gear 74 overlaps the operation part 76 in the conveyance direction TD. Furthermore, the gear 74 may be provided at a position where the meshing position of the gear 74 with the first rack 79R and the second rack 79L overlaps with the operation part 76 in the conveyance direction TD.

For example, in the state illustrated in FIG. 17, it is assumed that one of the auxiliary side end guide parts 75 is operated in a direction approaching the other of the auxiliary side end guide parts 75. Then, as illustrated in FIG. 18, the other of the auxiliary side end guide parts 75 is displaced in a direction approaching the one of the auxiliary side end guide parts 75. For example, in the state illustrated in FIG. 18, it is assumed that one of the auxiliary side end guide parts 75 is operated in a direction away from the other of the auxiliary side end guide parts 75. Then, as illustrated in FIG. 17, the other of the auxiliary side end guide parts 75 is displaced in a direction away from the one of the auxiliary side end guide parts 75.

Due to this, the medium 18 placed at the medium support tray 61 is positioned at the center in the X axis direction of the support surfaces 63 and 73 by the regulation of the side ends 18*m* and 18*h* by the side end guide part 65 and the auxiliary side end guide part 75.

As described above, according to the medium support tray 61, the medium conveyance device 60, and the recording device 12 according to the first embodiment, the following effects can be obtained.

The medium support tray 61 includes the support part 62 that supports the medium 18 to be conveyed. The medium support tray 61 includes the auxiliary support part 72 provided expandably with respect to the support part 62. The auxiliary support part 72 supports the medium 18 together with the support part 62 at the expanded position Pd that is upstream of the support part 62 in the conveyance direction TD of the medium 18. The medium support tray 61 includes the side end guide part 65 provided at the support part 62 movably in the X axis direction. The side end guide part 65 regulates the side ends 18*m* and 18*h* in the X axis direction of the medium 18 supported by the support part 62. The medium support tray 61 includes the auxiliary side end guide part 75 provided at the auxiliary support part 72 movably in the X axis direction. The auxiliary side end guide part 75 regulates the side ends 18*m* and 18*h* of the medium 18 supported by the auxiliary support part 72. The medium support tray 61 includes the coupling mechanism 80 coupling the side end guide part 65 and the auxiliary side end guide part 75. The side end guide part 65 moves in the X axis direction in conjunction with the movement in the X axis direction of the auxiliary side end guide part 75. The side end guide part 65 expandably guides the auxiliary support part 72 via the coupling mechanism 80.

According to this, since the medium support tray 61 includes the auxiliary side end guide part 75 in the auxiliary support part 72, the operability of the user is improved. Furthermore, the auxiliary side end guide part 75 has a function of regulating the side ends 18*m* and 18*h* of the medium 18 and a function of expandably guiding the auxiliary support part 72. Therefore, the configuration of the medium support tray 61 can be simplified as compared with a configuration provided with members having respective functions.

The coupling mechanism 80 includes the guiding part 77 provided at the auxiliary side end guide part 75, the guiding part 77 extending along the conveyance direction TD. The coupling mechanism 80 includes the lever 81 provided at the side end guide part 65 and fitted to the guiding part 77. Then, when the guiding part 77 slides with respect to the lever 81, the auxiliary support part 72 is expanded with respect to the support part 62. According to this, the medium support tray 61 can achieve the function of expandably guiding the auxiliary support part 72.

The support part 62 is provided at the device body 25 rotatably about the axis AR1 along the X axis direction, and the downstream end 62D in the conveyance direction TD is displaced by rotating. The lever 81 is provided displaceably with respect to the side end guide part 65 as viewed in the direction along the axis AR1. This can suppress the auxiliary support part 72 from being displaced by the rotation of the support part 62. Therefore, the medium support tray 61 can appropriately support the medium 18.

The lever 81 is provided at the side end guide part 65 rotatably about the axis AR1. This can suppress the auxiliary support part 72 from being displaced by the rotation of the support part 62. Therefore, the medium support tray 61 can appropriately support the medium 18.

The auxiliary side end guide part 75 includes the auxiliary side end guide part 75R that regulates the side end 18*m* of the side ends 18*m* and 18*h* of the medium 18, and the auxiliary side end guide part 75L that regulates the side end 18*h* of the side ends 18*m* and 18*h* of the medium 18. The auxiliary side end guide part 75 includes the operation part 76 provided at at least one of the auxiliary side end guide part 75R or the auxiliary side end guide part 75L. The auxiliary side end guide part 75 includes the first rack 79R provided at the auxiliary side end guide part 75R, extending in the X axis direction, and meshing with the gear 74. The auxiliary side end guide part 75 includes the second rack 79L provided at the auxiliary side end guide part 75L, extending in the X axis direction, and meshing with the gear 74.

According to this, the gear 74 meshing with the first rack 79R and the second rack 79L is provided at a position closer to the operation part 76 operated by the user than the side end guide part 65. This can reduce the load at the time of moving the operation part 76 in the X axis direction, and can improve the usability of the user.

The medium conveyance device 60 includes the medium support tray 61, and the conveyance unit FP that conveys the medium 18 supported by the medium support tray 61. According to this, since the medium conveyance device 60 includes the auxiliary side end guide part 75 in the auxiliary support part 72 of the medium support tray 61, the operability of the user is improved.

The recording device 12 includes the medium support tray 61, the conveyance unit FP that conveys the medium 18 supported by the medium support tray 61, and the recording unit 30 that performs recording on the medium 18 conveyed by the conveyance unit FP. According to this, since the recording device 12 includes the auxiliary side end guide part 75 in the auxiliary support part 72 of the medium support tray 61, the operability of the user is improved.

The medium support tray 61 according to the embodiment of the present disclosure basically has the configuration as described above, but it is of course possible to change or omit a partial configuration within a range not departing from the gist of the present disclosure. The medium conveyance device 60 according to the embodiment of the present disclosure basically has the configuration as described above, but it is of course possible to change or omit a partial configuration within a range not departing from the gist of the present disclosure. The recording device 12 according to the embodiment of the present disclosure basically has the configuration as described above, but it is of course possible to change or omit a partial configuration within a range not departing from the gist of the present disclosure. The above embodiment and other embodiments described below can be carried out in combination with one another within a technically consistent range. The other embodiments will be described below.

In the above embodiment, any one of the side end guide parts 65R and 65L may be fixed to the support part 62. For example, when the side end guide part 65R is fixed to the support part 62, the auxiliary side end guide part 75R is fixed to the auxiliary support part 72. In this case, the side end guide part 65R and the auxiliary side end guide part 75R need not be coupled by the lever 81. In this case, the first rack 79R, the second rack 79L, and the gear 74 may be omitted.

In the above embodiment, the guiding part 77 need not be a groove extending over the auxiliary side end guide part 75 along the conveyance direction TD. For example, the guiding part 77 may be a projection extending over the auxiliary side end guide part 75 along the conveyance direction TD. In this case, the tip of the projection may be provided with a claw-like engagement part with which the sliding part 84 of the lever 81 is slidably engaged.

In the above embodiment, the lever 81 need not be held by the side end guide part 65 rotatably about the axis AR1 as long as being displaceable with respect to the side end guide part 65. For example, the engagement part 67 with which the convex part of the rotating shaft 83 of the lever 81 engages may be a through hole having a circular shape, an elliptical shape, a rectangular shape, or the like larger than the outer diameter of the convex part so that the convex part can move along the Y-Z plane. This also can suppress the auxiliary support part 72 from being displaced by the rotation of the support part 62. Therefore, the medium support tray 61 can appropriately support the medium 18.

In the above embodiment, the lever 81 need not be provided movably with respect to the side end guide parts 65R and 65L as long as being slidable with respect to the guiding parts 77R and 77L. For example, the lever 81 may be fixed so as not to move to the side end guide parts 65R and 65L. For example, the lever 81 may be integrally formed with the side end guide parts 65R and 65L. The dimension in the X axis direction of the sliding part 84 of the lever 81 is made the same as the dimension in the X axis direction of a narrow width part of the coupling part 82. By this, the sliding part 84 is enlarged together with the narrow width part of the coupling part 82. The dimension in the X axis direction of the rail part of the guiding part 77 is made the same as the dimension in the X axis direction of the opening part.

This makes the sliding part 84 including the narrow width part of the coupling part 82 in the lever 81 slidable with respect to the opening part and the rail part in the guiding parts 77R and 77L. This also can suppress the auxiliary support part 72 from being displaced by the rotation of the support part 62. Therefore, the medium support tray 61 can appropriately support the medium 18. Also in this case, the lever 81 inserted into the opening parts of the guiding parts 77R and 77L is regulated from moving in the X axis direction with respect to the guiding parts 77R and 77L by the opening parts of the guiding parts 77R and 77L. By this, the side end guide part 65R is regulated from moving in the X axis direction with respect to the auxiliary side end guide part 75R. The side end guide part 65L is regulated from moving in the X axis direction with respect to the auxiliary side end guide part 75L. In this case, the coupling mechanism 80 includes the lever 81 and the guiding parts 77R and 77L of the auxiliary side end guide parts 75R and 75L.

In the above embodiment, the guiding parts 77R and 77L need not be grooves extending over the auxiliary side end guide parts 75R and 75L along the conveyance direction TD. For example, the guiding parts 77R and 77L may be rib-shaped projections extending over the auxiliary side end guide parts 75R and 75L along the conveyance direction TD. In place of the lever 81, the side end guide parts 65R and 65L may be provided with projections having grooves slidable in a state where the rib-shaped projections are interposed therebetween. In this case, for example, the projection having the groove is provided at a position overlapping the protrusion part 66 in the conveyance direction TD of the side end guide parts 65R and 65L, and protrudes toward the rib-shaped projections as the guiding parts 77R and 77L. This makes the grooves of the projections protruding from the side end guide parts 65R and 65L slidable with respect to the rib-shaped projections as the guiding parts 77R and 77L. This also can suppress the auxiliary support part 72 from being displaced by the rotation of the support part 62. Therefore, the medium support tray 61 can appropriately support the medium 18.

Also in this case, the grooves of the projections protruding from the side end guide parts 65R and 65L are regulated from moving in the X axis direction with respect to the guiding parts 77R and 77L by holding the rib-shaped projections as the guiding parts 77R and 77L. By this, the side end guide part 65R is regulated from moving in the X axis direction with respect to the auxiliary side end guide part 75R. The side end guide part 65L is regulated from moving in the X axis direction with respect to the auxiliary side end guide part 75L. In this case, the coupling mechanism 80 includes the grooves of the projections protruding from the side end guide parts 65R and 65L and the rib-shaped projections as the guiding parts 77R and 77L of the auxiliary side end guide parts 75R and 75L.

In the above embodiment, the gear 74 need not be provided at a position closer to the operation part 76 upstream of the center of the auxiliary support part 72 in the conveyance direction TD. For example, the gear 74 may be provided at a position downstream of the center of the auxiliary support part 72 in the conveyance direction TD.

What is claimed is:

1. A medium support tray comprising:

a support part configured to support a medium to be conveyed;

an auxiliary support part provided expandably with respect to the support part, the auxiliary support part being configured to support the medium together with the support part at an expanded position upstream of the support part in a conveyance direction of the medium;

a side end guide part provided at the support part movably in a width direction intersecting the conveyance direction, the side end guide part being configured to regulate a side end in the width direction of the medium supported by the support part;

an auxiliary side end guide part provided at the auxiliary support part movably in the width direction, the auxiliary side end guide part being configured to regulate the side end of the medium supported by the auxiliary support part; and a coupler coupling the side end guide part and the auxiliary side end guide part, wherein the side end guide part moves in the width direction in conjunction with movement of the auxiliary side end guide part in the width direction and expandably guides the auxiliary support part via the coupler, wherein the coupler includes a guiding part provided at the auxiliary side end guide part, the guiding part extending along the conveyance direction, and a lever provided at the side end guide part and fitted to the guiding part, and the auxiliary support part is expanded with respect to the support part by the guiding part sliding with respect to the lever.

2. The medium support tray according to claim 1, wherein the support part is provided at a device body rotatably about an axis center along the width direction, and a downstream end in the conveyance direction is displaced by rotating the support part and the lever is provided displaceably with respect to the side end guide part as viewed in a direction along the axis.

3. The medium support tray according to claim 2, wherein the lever is provided at the side end guide part rotatably about the axis center.

4. The medium support tray according to claim 1, wherein the auxiliary side end guide part includes a first guide part configured to regulate one of the side ends of the medium, a second guide part configured to regulate the other of the side ends of the medium, an operation part provided at least one of the first guide part or the second guide part, a first rack provided at the first guide part, extending in the width direction, and meshing with a gear, and a second rack provided at the second guide part, extending in the width direction, and meshing with the gear.

5. A medium conveyance device comprising:

the medium support tray according to claim 1; and a conveyance unit configured to convey the medium supported by the medium support tray.

6. A recording device comprising:

the medium support tray according to claim 1;

a conveyance unit configured to convey the medium supported by the medium support tray; and a recording unit configured to perform recording on the medium conveyed by the conveyance unit.

* * * * *